United States Patent [19]
Curry

[11] Patent Number: 5,105,558
[45] Date of Patent: Apr. 21, 1992

[54] APPARATUS AND PROCESS FOR DRYING CELLULOSIC AND TEXTILE SUBSTANCES WITH SUPERHEATED STEAM

[76] Inventor: Donald P. Curry, 350 Preble St., South Portland, Me. 04106

[21] Appl. No.: 684,064

[22] Filed: Mar. 28, 1991

[51] Int. Cl.$^5$ .............................................. F26B 3/00
[52] U.S. Cl. .......................................... 34/23; 34/77; 34/32; 34/219; 34/213
[58] Field of Search .................. 34/155, 156, 219, 218, 34/75, 78, 17, 60, 23, 37, 86, 209, 212, 210, 213; 162/202, 204, 207, 289

*Primary Examiner*—Henry A. Bennett
*Assistant Examiner*—Denise L. F. Gromada
*Attorney, Agent, or Firm*—Thomas L. Bohan

[57] ABSTRACT

Apparatus and process for the removal of moisture from cellulosic products such as pulp, paper and molded articles, and textile products, wherein gaseous water (steam) in a superheated state is utilized in an energy efficient manner as the drying medium. The apparatus is an enclosed system the operates continuously to dry the products while preventing air contamination from entering the apparatus and thereby reducing its drying efficiency. The apparatus comprises a plurality of drying sections wherein the number of drying sections connected in series is a function of the type and volume of the product or products to be dried. Within each drying section there exists indirect steam heating means, steam-recirculation means, an individual steam-supply chamber, and sections of a steam-return chamber which is open and common to all drying sections in the series. Air/vapor lock chambers at both ends of the apparatus prevent air incursion into the drying sections and at the same time permit a slight amount of excess steam from within the drying sections to vent out of the apparatus. Steam-condensing means located substantially entirely within the drying sections of the apparatus is utilized to recover a large percentage of the energy of the heat of vaporization. The process described herein involves conveying the products into the apparatus and directing the drying steam from the steam-supply chamber onto the products and drawing the spent steam away from the products. The spent steam, which comprises the drying steam in combination with the steam formed by the liberation of moisture from the products, is partially recirculated past the indirect heating means and back into the steam-supply chamber, and partially condensed by the internal steam-condensing means. The velocity at which the drying steam is directed onto the products can be varied in accordance with the type of product to be dried.

28 Claims, 9 Drawing Sheets

APPARATUS AND PROCESS FOR DRYING CELLULOSIC AND TEXTILE SUBSTANCES WITH SUPERHEATED STEAM

BACKGROUND OF THE INVENTION

1. Field of the Invention

This invention relates to an apparatus and process for drying cellulosic substances, such as pulp, paper sheet, and molded paper products, and textiles. More particularly, this invention relates to an apparatus and method of novel design that uses unsaturated water vapor (superheated steam) as the means to liberate both surface and bulk moisture from processed cellulosic and textiles materials in a continuous process. Even more particularly, this invention relates to a tunnel dryer designed to use steam as its drying means and assembling an array of novel features leading to greatly improved energy efficiency.

2. Description of the Prior Art

As a result of their fabrication process, all cellulosic products, be they pulp, paper web, or egg cartons, and textile products, have at some point a very high moisture content needing removal. This moisture-which typically constitutes 75% of the wet product weight- includes: (1) moisture on the surface of the product (surface water); and (2) moisture that is locked into the fibers of the product (bound water). The traditional means of removing this water has been to evaporate it by conveying the product through a tunnel dryer in which a hot gaseous drying medium is directed against the surfaces of the product, and, for some permeable materials, *through* the product. This drying by evaporation is extremely energy-intensive. The paper and pulp industry alone, with its large production volume consumes vast amounts of energy each year just in the drying stage of its production. Consequently, the reward for improving the drying efficiency is potentially very great. The applicant believes that the improved efficiency that his invention permits-particularly in the processing of molded paper products-represents a significant advance over conventional dryers, which consume about 120 Therms for every dry ton of product.

Traditionally, the drying medium of choice for tunnel dryers has been hot, dry air. The hot air technology developed decades ago during a period when energy costs were low compared to costs of construction and reflects this fact; it however continues to be used nearly universally in spite of its increasingly serious disadvantages. Among these disadvantages is the high cost of providing the energy to heat air as the drying medium, which, besides having a relatively low transfer efficiency, must be continuously replenished-as it is exhausted from the dryer with the water vapor that it has picked up from the items to be dried. (Once the air has become laden with water vapor as well as reduced in temperature, its drying capacity drops precipitously.) In addition, air as a drying medium has the potential to over-dry the products, thus embrittling them and/or imposing internal stresses that reduce their value. What is needed is a drying medium that has a heat transfer efficiency higher than air and that can be recycled. The closed system that the recycling requires leads in turn to the necessity of dealing with the water vapor removed from the products and entrained in the drying stream- water vapor that traditionally has just been vented into the atmosphere outside the dryer, with the energy required to evaporate it. Also needed is a means of allowing easy tunnel ingress and egress to the conveyor belt while keeping air out of the tunnel and the hot drying medium in.

The present invention uses gaseous $H_2O$ at a pressure of one atmosphere and at temperatures and densities that ensure that the gas is extremely undersaturated. (Stated differently, the drying medium is gaseous $H_2O$ at temperatures far above the dew point. Such atmospheres-be they at 70° F. or 700° F.-are referred to as superheated steam.) The invention consists of the drying process—designed to achieve a very high energy efficiency—and the apparatus needed to implement the process. How this is done can best be seen after a more detailed examination of what is entailed in drying cellulosic (and other fibrous) products.

When the wet product is introduced into the tunnel, it has water standing on its surface. The first stage of the drying consists of the evaporation of that surface moisture. During this first stage, the rate of water removal remains constant, and at a level that is a function of the mass per unit time of drying medium impinging on the product. Surface moisture removal continues at this constant rate until the surface moisture is gone, by which point the product's total moisture content is reduced to approximately 30% of the total weight of the product (the exact percentage at this stage depending on the particular item involved). The moisture remaining is in the bulk of the product, contained in its fibers; the removal of the bulk moisture depends upon capillary action to draw it along the fibers up to the surface, where it is vaporized by the drying medium. As a rule, the rate of water removal falls precipitously and continues to fall as the bulk moisture is being removed. The amount of energy required to liberate this bulk moisture is a function of the length of the fibers of the product and other factors affecting the "wick efficiency." In the dryers currently used in the pulp and paper industry- those using air as the drying medium-the energy required to remove the bulk moisture is approximately equal to that required to remove the surface moisture, in spite of the latter comprising a much larger quantity. Unlike the case of the surface moisture, the rate of removal of bulk moisture is not directly proportional to the rate at which the drying medium impinges upon the product.

When air is used as the drying medium, the product (consisting either of discrete items such as molded paper/pulp products or of a continuous sheet such as paper web, raw pulp or textiles) is conveyed down the tunnel with a stream of hot, dry air impinging on it. Because of the once-through path for the air, which comes in dry and exits carrying away vaporized moisture, the product is exposed at each step of the way to very low humidity air. Products thus dried often exit the drying chamber with their moisture content reduced to approximately 1-3% by weight. Once out of the chamber and exposed to ambient air, they regain moisture up to some equilibrium point (about 6-8% moisture by weight), though not instantaneously and not uniformly. In this way, air as the drying medium in current systems may over-dry the product to the point where natural atmospheric conditions replace moisture that the dryer has had to expend significant energy to remove. If this over-drying occurs, moisture is reintroduced by the ambient atmosphere in an uncontrolled fashion that can set up internal stresses leading to product warpage and other deleterious effects rendering the product less than satisfactory.

While this problem can be controlled in present hot-air dryers by regulating the dwell time of the product within the dryer, a further problem exists with such dryers. In particular, high-speed, hot-air drying tends to case-harden and warp the surface of the product. This leads not only to poor product quality, it may also, in effect, entrap moisture by reducing the wicking efficiency of the product fibers. As a result, it becomes more difficult for bound water to escape to the surface to be vaporized. (Entrapping bound moisture in this manner leads to even poorer quality products.)

It is well-known that steam (that is, gaseous $H_2O$-not to be confused with the airborne liquid water droplets known vernacularly by the same name) transfers heat more efficiently than does air. Steam at a temperature T will exchange more heat with a surface it is in contact with than will air at the same temperature, all other things being equal. That is not the whole story, of course, since it takes more energy to heat up a unit volume of steam to temperature T than it does to heat up the same volume of air to the same temperature; also, since the ultimate goal is to dry the product, the degree of saturation of the steam atmosphere is a very important parameter to control when steam is the drying medium. From thermodynamic considerations it is seen that the heat transfer efficiency depends upon the enthalpy of the fluid (air or steam). At a pressure of one atmosphere and temperatures above 375° F., steam has an enthalpy at least 30% higher than that of hot air. If the gas is a mixture of air and steam, the enthalpy is intermediate between that for steam and that for air. Consequently, another consideration that must be dealt with in designing a dryer using steam as the drying medium is maintaining the purity of the steam; the extra capital expense involved in such systems can result in a net *loss* in efficiency if the steam becomes significantly contaminated with air. Since it is essential in such systems that the drying medium be continuously recirculated, the maintenance of the steam's air-free status is a serious problem; a small air leak can over a period of time significantly dilute the recirculating steam. (This is a difficulty that does not arise in systems where the drying medium just goes once-through and then out the other end of the dryer.)

As a theoretical idea, the use of steam as a drying medium is not new. This is true even within the field of pulp and paper drying (though there is apparently no prior art addressed at drying molded paper products and the special problems that this entails). See, for example, Dungler I (U.S. Pat. No. 2,590,849—issued Apr. 1, 1952), which teaches a method for continuous drying using steam as the medium. Although Dungler I is concerned almost exclusively with textiles it also alludes to paper and other fibrous materials-but only those that can be drawn continuously through the drying tunnel and are sufficiently permeable that the drying medium can impinge them at high velocity. In particular, Dungler I suggests using steam to dry thin sheets of material or paper, whereby the item to be dried is *affixed* to a permeable conveyor belt and superheated steam blown through it to liberate bulk moisture. U.S. Pat. No. 2,682,116 issued to Dungler in 1954 (Dungler II) discloses apparatus for effecting the method disclosed in Dungler I. Both the apparatus and method claimed in Dungler II relate to very high impingement velocities *and* to the establishment, using a complex vacuum generating system, of a pressure differential across the web of product to be dried. The apparatus and method of Dungler II would be completely inapplicable to the drying of molded paper products, which are not continuous and which are impermeable even to the high impingement velocities envisioned by Dungler II. In addition, those high velocities would compromise the position integrity of such products as they are conveyed through the dryer. A similar approach is used by Gillis (U.S. Pat. No. 2,760,410), which discloses particular plumbing and vacuum arrangements for the use of 400°-1500° F. steam to dry continuous webs of pervious paper. Luthi (U.S. Pat. No. 4,242,808, 1981), claims a method and apparatus for using steam to dry paper web, either pervious or impervious to the drying medium. Luthi recognized the efficiency associated with superheated steam heating, and goes further than Dungler I and Dungler II in noting that the steam must not be contaminated with air if the drying medium is to be as efficient as possible; nevertheless, Luthi does not set out the particular techniques that are necessary to ensure minimum air contamination. Also, Luthi with its high impingement velocities is inappropriate to the drying of individual items.

Although the process of drying certain pulp and paper products with steam has been disclosed in principle in the above-cited prior art, it has rarely if ever been reduced to practice commerically. Within the molded paper product industry the process has never been developed even in theory, and it is the molded paper product industry that will be burgeoning during the coming years and in need of industrial processes that are far more energy-conserving than those used in the past. That is, current environmental concerns associated with plastic containers has led to the reintroduction by large-scale users of food containers-especially the fast food outlets-of molded cellulosic articles, bringing pulp and paper processing plants under increasing pressure to develop their capacity to handle such products efficiently. More efficient drying will play a key role in overall efficiency, and it is submitted that more efficient drying will use steam as a drying medium. However- and as alluded to above-because molded products are generally much thicker than paper web and sheet, use of the prototypical steam dryers taught by the prior art cited above would require even greater steam velocities or longer dwell times to drive out trapped moisture. This would increase the likelihood that the molded articles would be displaced on the conveyor or blown off completely. A further problem associated with increased steam output is the greater rate of energy production needed; this in turn puts a greater premium on steam recovery techniques, something that has not traditionally been a significant concern. To realize the goal of greater overall energy efficiency through the use of steam in connection with the drying process, the energy used to produce the superheated steam must be recovered from the sheet or article after the drying has taken place. This leads to still another problem-the need to provide structurally sound piping systems and sophisticated steam recovery devices-items that drive up the cost of a steam dryer and drive down its desirability in any trade-off analysis. Therefore, while a steam dryer is in theory more efficient than a hot-air dryer, an evaluation of the two methods must consider: (1) the possibility that two types of steam dryers would be required- one for continuous sheet or web and one for molded articles; and (2) that the hardware required to dry with superheated steam would be much more expensive.

It is plausible that the failure to implement steam drying even for pervious and continuous paper webbing is attributable to the costly dryer sizes and structures required by steam systems. A truly efficient steam dryer requires a chamber and an associated air-channelling system, both of which are essentially air-tight and which are capable of withstanding temperatures above 375° F., and up to 1600° F. Another problem-and one associated with pulp and molded articles in particular-involves the increased difficulty in drying products that are much thicker than simple fabrics and paper webs. Increased thickness of the item to be dried means that much higher impingement velocities—or longer dwell times—are needed to establish and maintain the heat transfer rate needed to extract the moisture trapped within the product. Higher velocities tend to blow molded articles off the conveyor that carries them along in the continuous drying process. Even slight shifts in the position of the articles are serious since in the continuous processing of such discrete articles it is extremely important to maintain position integrity; automatic stackers pick the articles off the conveyor as they come out of the dryer. These types of products present still another problem to continuous drying, either by steam or by air-they vary in size and shape to such an extent that variations in drying times generally require varying either the length of the dryer or the dwell-time within the dryer. Therefore, while the superheated steam drying discussed by Dungler and Luthi is possible in theory, there are practical problems associated with the use of steam that must be addressed before a practical reduction to practice can be achieved. Furthermore, there are theoretical problems associated with the use of steam to dry individual molded items that must be addressed.

What is therefore needed is an industrial dryer for paper and pulp products that is more efficient than conventional dryers, especially where molded paper products are involved. In particular, what is needed is an industrial dryer using superheated steam as a drying medium and that can be effectively integrated into the complete manufacturing process to the extent that heat and water generated by the dryer is used in other parts of that process. More particularly, what is needed is such an industrial dryer which can—with a minimum of disruption—replace the conventional hot air dryers currently installed within the textile and pulp and paper industries, so as to reduce the vast and growing energy expenditure which that industry demands.

SUMMARY OF THE INVENTION

It is an object of the present invention to provide an extremely efficient superheated steam dryer for all types of pulp and paper products—molded articles in particular—and textile products as well. It is a further object of the present invention to provide continuous drying without the requirement or use of very high impingement velocities for the drying medium, superheated steam. It is still another object of the present invention to provide a superheated steam dryer for the continuous drying of molded articles in such a way that the individual articles will not be disturbed by the impinging steam. It is finally an object of the present invention to provide a superheated steam dryer that can be utilized for all types of pulp and paper products-despite the size or shape-in a continuous drying operation and one from which the low-temperature "waste heat" can be captured for use elsewhere within the manufacturing process, rather than be exhausted to the atmosphere as in conventional dryers.

The present invention overcomes the problems associated with the prior art steam dryers through extensive redesign and optimization of the dryer hardware. This redesign was premised on: (1) the key role played by the volume of steam that comes into contact with the product to be dried; and (2) an analysis of what is involved in breaking through the product's surface barrier so as to transfer the heat needed to drive out the moisture trapped with the product bulk. Driving off a particular quantity of moisture, first from the surface of a product and then from within the product, requires the transfer of a particular magnitude of energy which is proportional to the integrated flux of steam coming into contact with the surface per unit time at a fixed temperature. Removing the surface moisture is straightforward; the rate at which the surface moisture is removed is directly proportional to the total flux of the drying medium and so to the impingement velocity. Removing the bulk moisture-once the product surface is dried-is more complicated and requires dealing with the surface barrier. Ultimately, as the flux of drying medium (and therefore heat) delivered to the product's surface increases, the rate of drying becomes limited by the capillary action within the product. Once that stage is reached, the drying rate no longer increases in direct proportion to the velocity of the drying medium but rather with some much smaller power of the velocity, typically 0.6. Consequently, increasing the impingement velocity above the level needed to break through the surface barrier is wasteful.

The present invention uses a steam impingement velocity which is just enough to break through the surface barrier and deliver the necessary heat to the bulk of the sheet or article. Whereas the prior art devices suggest that the velocity of impingement must be high enough to force the steam into *and* through the fabric or web to vaporize the moisture while it is still within the product (generally at velocities of 7,000-10,000 feet per minute), the present invention uses just enough velocity to break the barrier and transfer the necessary heat—at most, that velocity is 3,000 feet per minute. In this way the present invention is a more efficient steam dryer in that it provides just enough steam to do the job. The present invention provides, at a minimum, 970 BTU's of energy in order to evaporate one pound of water from the wet products. By doing so at efficient impingement velocities, the present invention reduces the amount of steam that must be generated at the outset, and it reduces the amount of evaporated steam that must be recovered.

The present dryer has many features of conventional hot air dryers. Products to be dried are introduced at one end, conveyed or pulled through it, and directed out of the dryer at the opposite end. The drying medium—conventionally air, here steam—is directed onto the products as they pass through the tunnel. The tunnel comprises several isolated supply chambers—each with its own set of impingement nozzles—and a return section which is open the entire length of the tunnel. Due to the efficient heat transfer obtainable from steam, these chambers are shorter than are those of conventional dryers. Also in contrast to conventional dryers, the system under discussion also contains means within the tunnel for recovering and reusing the steam originally charged into the tunnel before the products have been introduced, as well as the steam generated by the evaporation of the moisture that is located on and within the products.

Specific questions that had to be addressed in developing a high efficiency superheated steam dryer applicable to the drying of individual paper items are as follows: 1) how to recirculate; 2) how to avoid accidental misalignment of small, lightweight items positioned on the conveyor belt; 3) how to keep air out of the recirculating steam; 4) how to preserve the dryer's thermal insulation; and 5) how to recover and reuse steam originally charged to the dryer, as well as the steam generated from the evaporation of the product moisture.

An important feature of the present invention is the means by which drying steam is applied to wet products at a velocity high enough to break the product surface vapor barrier, and by which the "spent" steam is drawn away from those products. The movement and recirculation of steam is achieved in the present invention by placing large capacity recirculation fans in the open return section of each drying section of the tunnel, wherein each drying section comprises one of the isolated steam supply chambers. These recirculating fans operate by drawing spent steam away from products being conveyed through the tunnel. The spent steam, which is a combination of drying steam originally contained within the tunnel and the steam resulting from the liberated moisture on or in the wet product, is drawn into the fan inlet and directed past one or more indirect steam heaters. In a single-conveyor dryer, the recirculating fan is located in the ceiling and to one side of the drying section. There is one indirect heater paired with each recirculating fan and that heater is located to one side of the fan in an upper section of the supply chamber. In a double-conveyor dryer, the recirculating fan is also located in the ceiling of the drying section, but it is centered in the tunnel. In this way, two indirect heaters, each located on either side of the fan, heat the spent steam which the fan draws from the return section. The recirculating fan then forces the heated steam into the supply chamber for application to the next wet products passing through. In order to accommodate a variety of types of products, the recirculating fan is of the type that can be operated by variable control means. This variability enables the operator to vary the product dwell time within the dryer as a function of the product and the need to maintain product position integrity on the conveying means.

It is essential that small articles participating in a continuous production process maintain their exact positions on the dryer conveyor while passing through the tunnel. Efforts to meet this concern with current hot-air dryers have presented many problems. One approach has been to position the supply orifices above and below the belt on which the article travels, and to align them pairwise in an attempt to balance the forces exerted on the molded paper products-which are progressively lighter as they are divested of their moisture. This localization of the hot air steam can result in cold spots, and irregular drying. The present invention approaches the turbulence problem so that the orifices can be positioned in a way that avoids the cold-spot problem completely.

The key step making the turbulence reduction possible without the introduction of uneven drying was to make the supply orifices much larger than they have traditionally been. (Indeed, they are perhaps better referred to as supply ducts, such is their size and shape.) In this way a much lower impingement velocity is possible even while maintaining the volume of steam delivered to the product per unit time—and per unit area—at a high level. The limiting constraint is only that the velocity be high enough to break the "surface barrier" and thus permit the drying medium to get sufficiently close to the item so that efficient heat transfer is ensured along with a low humidity atmosphere directly next to the item's surface. In designing the flow rate for the drying medium it was observed that impingement velocities higher than this are wasteful. Besides causing unnecessary turbulence, these higher impingement velocities deliver heat to the system that is not efficiently used. It is found that an impingement speed of approximately 1000 feet per minute is necessary and sufficient to break the surface vapor barrier. To the extent that the resulting flux of drying medium is inadequate to dry the items, one simply increases the dwell time of the items within the tunnel. This is far more efficient than increasing the impingement velocity; furthermore, with the efficiency increase delivered by the present invention, dwell times are decreased from those necessary with hot air dryers, even with their higher impingement velocities. One goal of the present invention is to provide only enough steam to dry the product and at a velocity that is just enough to break through the surface vapor barrier of the product and deliver the necessary heat to the bulk moisture. Through optimization of the steam supply hardware the quantity of steam delivered to the product is therefore minimized and the present superheated steam drying system is at its most efficient. Simultaneously, the cold-spot problem is fixed by positioning the orifices so that the impinging steam hits the article at a uniform temperature. In part this optimization is achieved by accurately sizing the orifices, and in part by positioning them at specific variable distances-distances that depend upon the nozzle to conveying means distance and the type of product to be dried-and by offsetting them so that as the conveyor belt moves through the tunnel different portions of it are uniformly under an orifice. As a result, a uniform volume of steam is imparted to a uniform section of the conveyor in a manner that provides a constant low-velocity impingement to the product being conveyed through the dryer.

Another novel aspect of the hardware of the present invention involves the steam return system. Conventional dryers have exhaust systems for the returning gases. Because the hot air (or steam) liberates a liquid from the product by vaporizing surface moisture and entrained moisture, the volume of gas (a mixture of air and water vapor) exiting the drying region is greater than the volume of gas impinging the product. If the exit area is equal to, or less than, the supply area, the increased volume of gas must leave at a higher velocity than the entering gas, resulting in turbulence around the product. For sheet products that are affixed to the conveyor this is not a problem, since turbulence will not affect their position integrity. For molded articles, however, this turbulence knocks the articles out of position and makes it impossible to use automated stacking after the drying process.

Besides going to large orifices and, consequently, low impingement velocities, the present invention attacks the turbulence problem by redesigning the means by which spent steam may exit the tunnel. In the present invention, the regions immediately adjacent to the supply ducts in both the top and bottom of the tunnel are open and comprise "ducts" by which the spent steam and evaporated vapor can exit the tunnel. The cross sectional area of the exhaust ducts is so much larger than that of the supply orifices that the exiting gas can move at a low velocity and therefore minimize turbulence. In this manner, instead of being deflected and contributing to the item-moving turbulence, the spent steam and entrained evaporation vapor simply exit the tunnel and are conducted to a recycling station. This is an important factor in allowing the impingement velocity to be as high as it is without shifting the light items.

An added benefit of the wide-open exit area is that there is a significant reduction in the piping required in the manufacture of the superheated steam dryer of the present invention. Besides enabling the present invention to dry molded articles with superheated steam, these unique features result in a dryer which uses steam much more efficiently than the prior art steam dryers previously discussed. Further, the hardware disclosed in the present invention is more economical to manufacture than prior art devices because there is no need for extensive return piping and many exhaust fans, all of which must have the structural integrity to withstand the severe environment of superheated steam. In this way, the present invention provides a steam dryer that is commercially feasible and that can be used for all cellulosic substances-from pulp and molded articles to paper web and fabrics.

Much of the advantage of the hot steam as a drying medium is lost if there is any significant contamination by air. Since the steam is continually being recirculated with every gas that becomes entrained within it, even small air leaks are serious. There are two primary sources of contaminating air: the shafts of the many recirculating fans and the ingress/egress ports for the belt(s). The standard high capacity industrial fans suited for commercial paper/pulp dryers tend to have a leak rate along the shaft of about 25 cubic feet per minute (cfm), given the pressure difference between the ambient atmosphere and the pressure within the dryer near the shaft. The present invention required much lower leakage rates than this; thus it incorporates high volume fans designed for it to have a leakage rate of about one cfm under the conditions specified above.

The more serious problem—and one entailing a less mundane solution—was presented by the ingress/egress ports of the dryer. There have been some prior art attempts to deal with this problem by either using tight-fitting slits (nips) for the entrance and exit of the product and the natural overpressure existing because of the evaporated vapor. Obviously the nips, while possible for continuous paper web, are impossible when the product entering and leaving the tunnel is comprised of individual items resting atop a conveyor belt. Also, the air-exclusion-through-overpressure solution is not tenable in a system designed to optimize energy efficiency. It is a major goal of the applicant to recapture, to the greatest extent possible, the heat introduced with the steam; this includes that fraction of the steam heat was is transformed into latent heat of vaporization contained in the evaporated moisture.

The present invention introduces novel "air/vapor locks" at both the ingress and egress ports of the tunnel. The conveyor belt passes directly through these air/vapor locks, which are in direct communication with the ambient room air, on one side, and the tunnel air on the other. More specifically, the air/vapor lock at the ingress is a transition stage between the room which contains the tunnel and the first tunnel segment. It is open to mass transfer from both sides. Air comes in from the room and air-free steam comes in from the tunnel segment. (An identical arrangement exists at the far end of the tunnel, with that air/vapor lock serving as a transition between the final tunnel stage and the room.) The mixture of gases within the air/vapor locks is exhausted through the tops thereof, thus setting up a strong vertical flow within the air/vapor lock interior. This vertical circulation prevents air from passing (horizontally) from the room into the tunnel. Although the air/vapor lock system depends for its operation on a slight overpressure within the tunnel, there is a feedback mechanism used that leads to the minimization of steam outflow from the tunnel. The feedback system depends upon a dewpoint sensor placed in an exhaust means of the air/vapor lock, where the air stream and the steam stream are well mixed. If the volumes of gas contributing to the mixture are equal, the total absolute humidity ($H_2O$ mass per unit volume) sensed should be half-way between the absolute humidity of the room and the absolute humidity of the tunnel. If that measured humidity departs from what has been determined to be optimum (i.e., minimum outflow from tunnel combined with zero "leakage" through the air/vapor lock to tunnel), the exhaust fan speed can be varied or the condensation rate within the tunnel (see below) varied.

Most of the energy that recirculating steam introduces into the items to be dried is converted into latent heat of vaporization as moisture evaporates from those items. To recover that energy, it is necessary to condense the resultant vapor; for that purpose a steam condenser is placed in the steam return section of the tunnel. The heat of vaporization is dumped into the cooling water which then conveys it to other stages of the production process via heat exchanger means. In addition, the hot condensate—at temperatures typically about 200° F.—may be conveyed from the floor of the tunnel, through a cleaning procedure and then over to those stages of the manufacturing process that require hot water. In this way, most of the water needed in the production process is recycled, rather than being discharged into the atmosphere. This is a conservation measure that is fairly easy to implement in a dryer using steam as the drying medium, but which is all but impossible to implement in air dryers, where the absolute humidity even in the presence of the evaporated moisture is much lower.

Besides increased efficiency in energy recovery which the internal condenser makes possible (that prior art that used energy-recovering condensers at all located them outside of the dryer), the cooling that it introduces is beneficial since this ensures that the dried products exit the tunnel at a temperature more appropriate for handling and for exposure to the room air (which can support combustion, should the paper product be at its ignition temperature). The condensation rate—which is adjustable—is established using humidity measurement means in the air/vapor locks as well as humidity measurement means in the room containing the dryer. When the humidity within the air/vapor locks exceeds the humidity in the room, the rate of internal condensation may be increased.

Although there is not a significant vapor pressure difference between the inside and outside of the dryer, one that would support a convective flow of steam out the inside wall, there is a very great difference in atmospheric water content—that is, in water vapor pressure.

Efforts must therefore be made to prevent the inside air from diffusing or otherwise migrating through the walls. The walls contain six inches or more of high-temperature thermal insulation, which quickly loses its insulating qualities once it becomes wet, as it would as the steam passed into it and then condensed. Because of these considerations, all the sections of the inner tunnel wall must be welded together with a continuous bead.

The present invention thus provides an extremely energy-efficient, continuously-operated steam dryer for all types of processed cellulosic and textile products. The novelty and utility of the present invention resides in its ability to retain steam within the dryer and maximize the heat transfer efficiency of that steam by minimizing the amount of contaminant air permitted to enter the dryer. Another novel and useful feature of the present invention—one that sets it apart from prior art dryers—is its ability to recover the latent energy of spent recirculating steam, as well as the steam formed by the liberation of moisture from the product being dried, while that steam is contained within the dryer. These novel features and others will become apparent upon review of the detailed description of the preferred embodiment.

DETAILED DESCRIPTION OF THE PREFERRED EMBODIMENT

Figure 1:
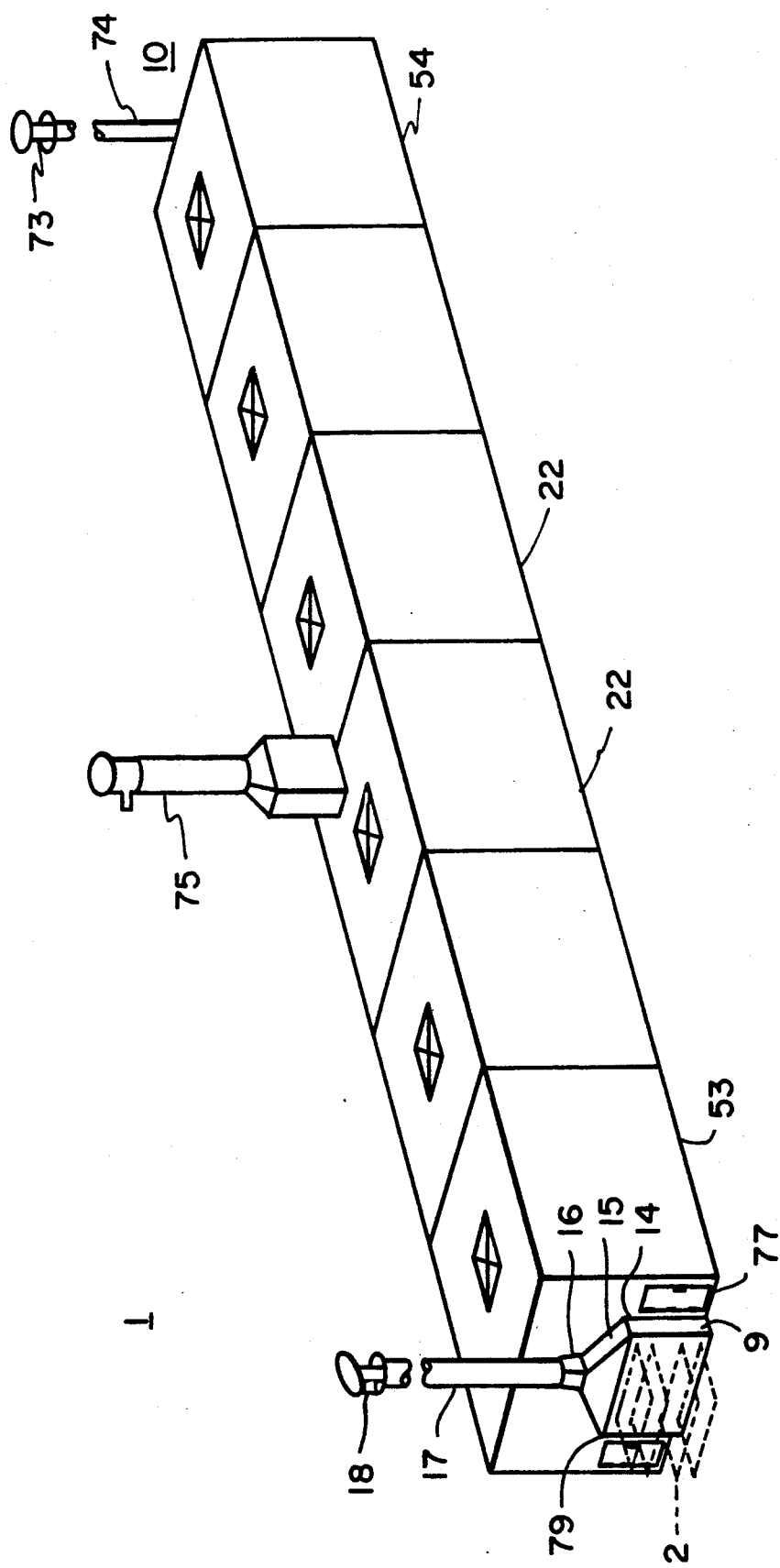
FIG. 1 is a perspective view of a steam dryer of the present invention, with a double-conveyor system.
Figure 2:
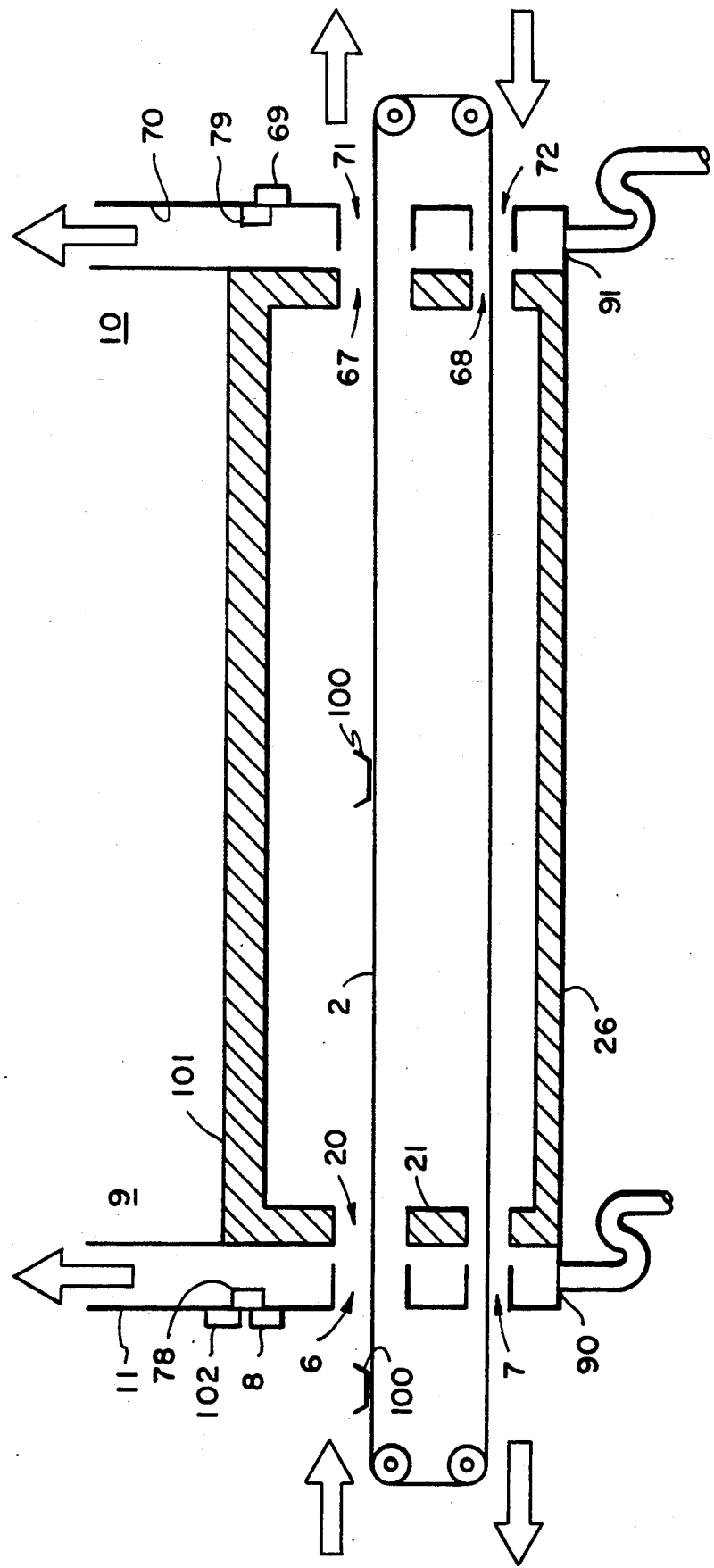
FIG. 2 is a cross sectional side view of a steam dryer of the present invention, with a single-conveyor system.

A steam dryer 1 of the present invention, as illustrated in FIG. 1, operates continuously to dry a multiplicity of types of pulp and paper products and textile products (generally identified as products 100), wherein said products 100 are either pulled through said steam dryer 1, or conveyed by one or more conveyors 2. Generally, and as illustrated in FIGS. 1 and 2, said steam dryer 1 comprises a wet-end air/vapor lock chamber 9, a dry-end air/vapor lock chamber 10, a plurality of steam drying sections 22, internal steam-condensing means 5, maintenance access doors 77, and a cooldown exhaust stack 75. Each one of said steam drying sections 22 contains indirect steam heating means 19, steam-recirculation means 13, a plurality of compartmentalized steam-supply chambers 3, and sections of a single, open steam-return chamber 4. In the preferred embodiment, said indirect steam heating means 19 is a gas-fired indirect heater 19, and said steam-recirculation means 13 is a variable-speed, centrifugal plug fan 13.

The dryer 1 illustrated in the FIGURES is the type that has said conveyors 2 as product conveying means for moving products into and out of said steam dryer 1. It is to be understood however, that pull-through and float-through types of said dryer 1 comprise essentially the same components as described herein. In particular, said wet-end air/vapor lock chamber 9 comprises either one or two wet-end product entry ports 6 and a corresponding number of wet-end conveyor belt return ports 7, all of which are centered in a rectangular section 14. A wet-end dewpoint controller device 8 is attachable to an outside wall 11 of said wet-end air/vapor lock chamber 9, and a wet-end dewpoint sensing device 78, which provides a measure of the dewpoint within said wet-end air/vapor lock chamber 9, is positioned within said wet-end air/vapor lock chamber 9. (Said wet-end controller device 8 compares the dewpoint within said wet-end air/vapor lock chamber 9 with the dewpoint of the atmosphere surrounding said steam dryer 1. Based upon the information obtained, said wet-end dewpoint controller device 8 and a dry-end dewpoint controller device 69 control the operation of said internal steam-condensing means 5.) In the preferred embodiment, said rectangular section 14 is approximately 3 feet long and its width and height are dependent upon the drying load and whether one or two conveyors 2 have been incorporated into the design of said steam dryer 1; if there is only one conveyor, the width of said rectangular section 14 is about 6 feet and the height is about 9 feet; if there are two conveyors, the width is about 9 feet and the height is about 12 feet. A first tapered section 15 is affixed to a top 79 of said rectangular section 14, and is connected to a first transitional section 16. Said transitional section 16 is then connected to a wet-end exhaust stack 17, which, in turn, is affixed to a wet-end exhaust fan 18. Said exhaust fan 18 draws a gaseous mixture from said wet-end air/vapor lock chamber 9, where said gaseous mixture comprises air from the atmosphere surrounding said steam dryer 1 and spent steam emitted from said steam-return chamber 4 of a wet-end steam drying section 53. Within said wet-end air/vapor lock chamber 9, said rectangular section 14 contains wet-end steam drying section entry port 20 and wet-end steam drying section conveyor return ports 21, which are located at a side opposite from said wet-end product entry port 6 and said wet-end conveyor belt return port 7. Said products 100 enter said wet-end steam drying section 53 via said entry ports 20, and said spent steam exhausts from said steam-return chamber 4 into said wet-end air/vapor lock chamber 9 via said entry ports 20 as well as said return ports 21. Any steam condensing within said wet-end air/vapor lock chamber 9 is removed from said chamber 9 via a wet-end air/vapor lock drain 90.

Figure 4:
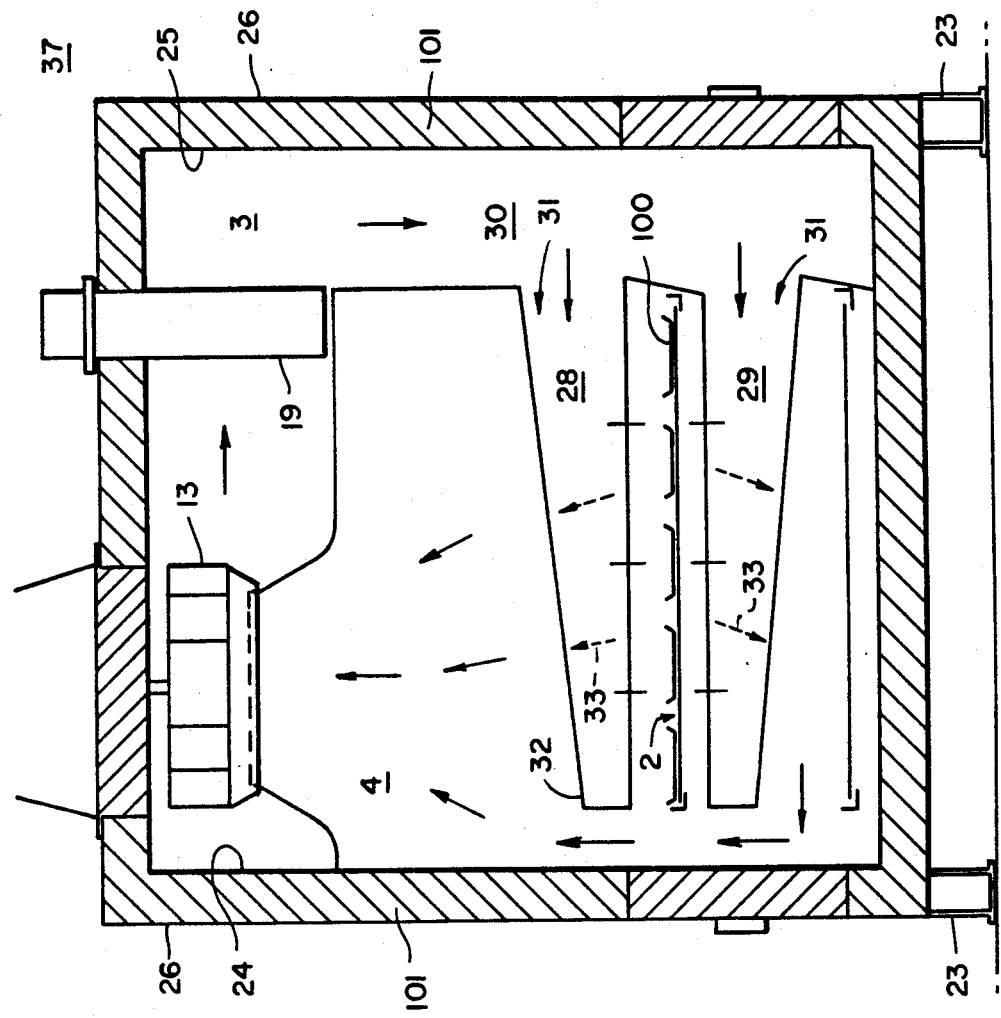
FIG. 4 is a cross-sectional view along the width of a drying section of a steam dryer of the present invention, with a single-conveyor system.
Figure 3:
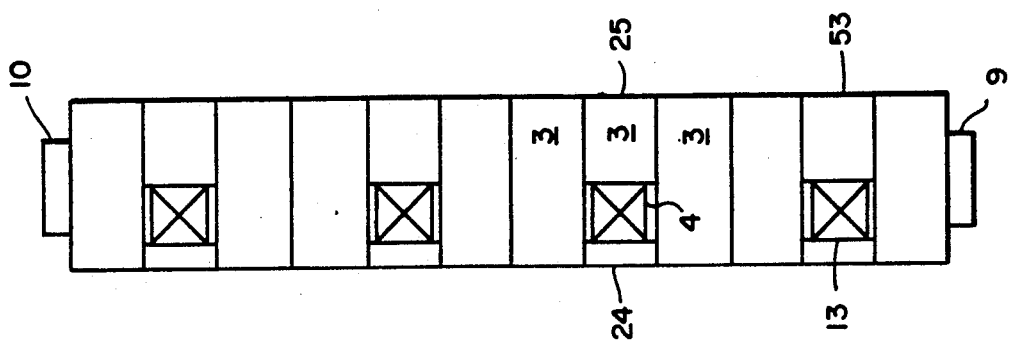
FIG. 3 is a top view of a steam dryer of the present invention, with a single-conveyor system.
Figure 5:
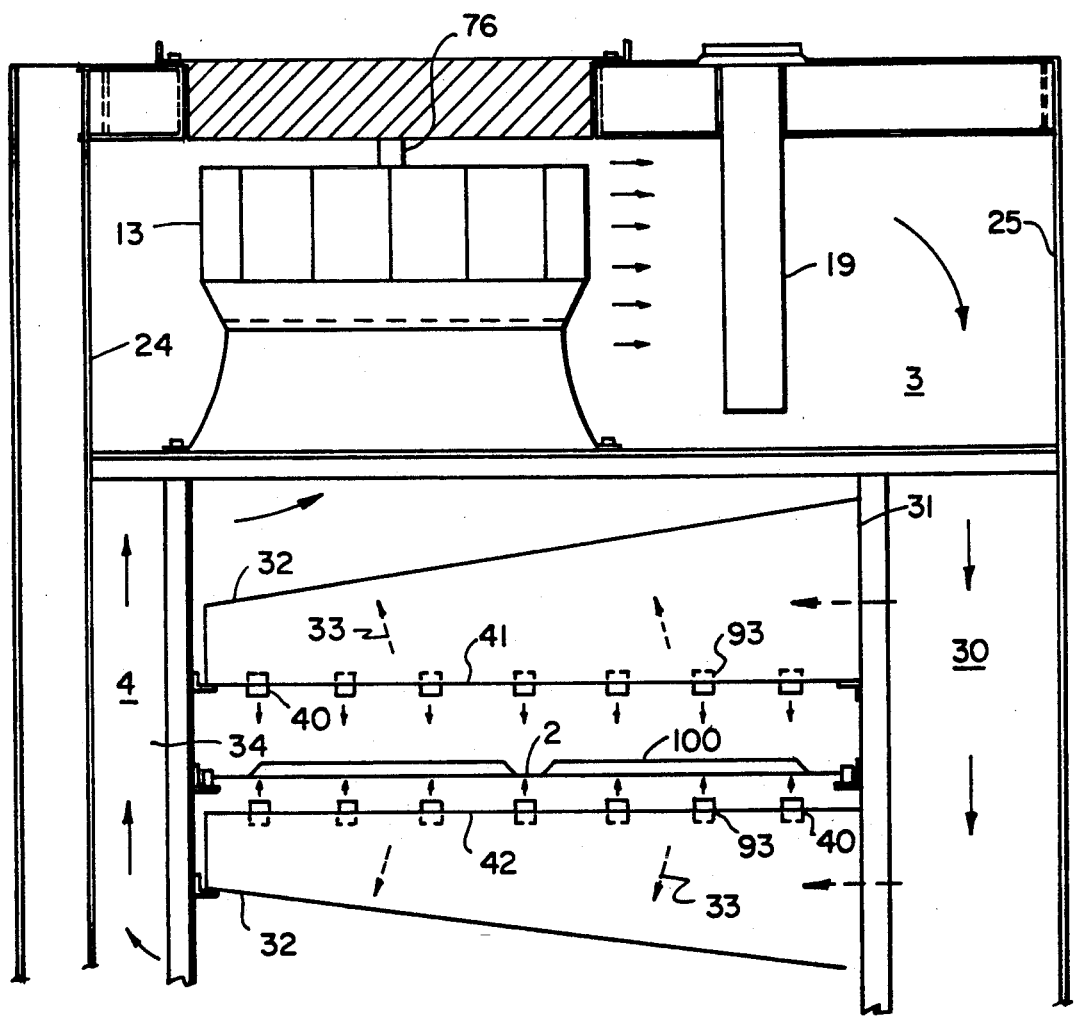
FIG. 5 is a cross-sectional view along the width of a drying section of a steam dryer of the present invention, illustrating the nozzle arrangement within the drying section for a single-conveyor system.

As previously noted, said steam dryer 1 may be used to dry any of a number of types of pulp, paper and textile products. In order to accommodate the variation in drying requirements, the present invention may be formed by connecting a plurality of steam drying sections 22 configured in the same manner as said wet-end steam drying section 53. The length of said dryer 1 is generally determined by the desired product capacity as well as the moisture content of the product and the required dwell time the product must remain within said dryer 1 to reduce the moisture content of the product. Typically, for molded articles, the length of said dryer 1 is about 126 feet; for thinner products and products for which there is no concern of article displacement, the length of said dryer 1 may be less. When said steam dryer 1 operates with a single conveyor 2, said steam drying sections 22 are designed as illustrated in FIGS. 3–5. In the preferred embodiment of such a single conveyor dryer 37, said steam drying sections 22 are about 12 feet long×6 feet 6 inches wide×8 feet in height, and rest on 6-inch steel channels 23. In a double conveyor dryer 38—generally illustrated in FIGS. 1, 7 and 8—the length remains the same; however, the width is 12 feet and the height is 15 feet. Left-side interior walls 24 and right-side interior walls 25 of said drying section 22 are fabricated of aluminized steel. In order to maintain the operating temperature within said steam dryer 1 at a desired level, 6 inches of insulation means 101 is contained between all interior walls 24 and 25, and exterior walls 26 of said steam dryer 1, and all of said interior walls are welded together to seal the interior of said steam dryer 1 so that the integrity of said insulation means 101 will be maintained. Within said steam drying sections 22, said recirculating plug fan 13 draws return steam from said steam-return chamber 4 and forces it past said heating device 19. The heated steam is then directed into three steam-supply chambers 3, each of which is the same width and height as any of said drying sections 22, but only one-third of the length of said drying sections 22.

Figure 7:
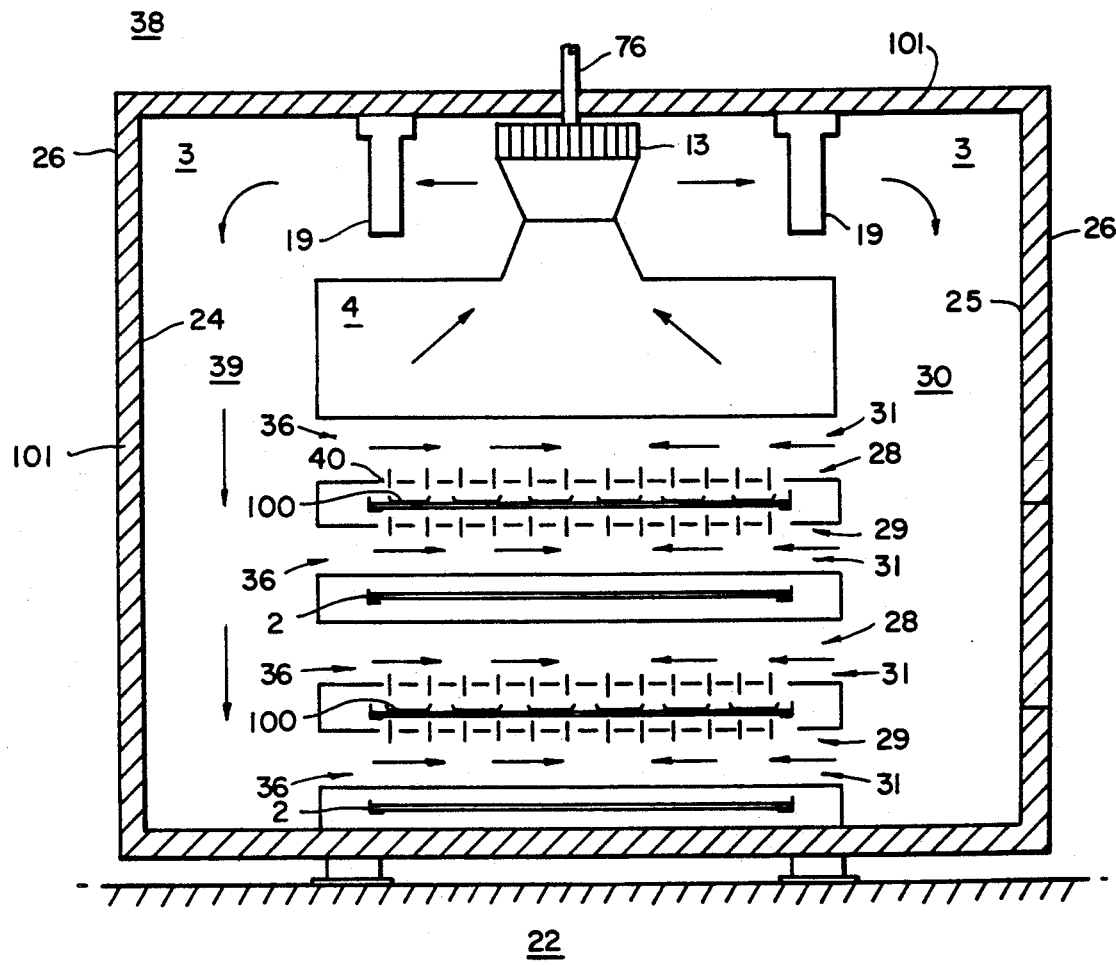
FIG. 7 is a cross-sectional view along the width of a drying section of the present invention, with a double-conveyor system.
Figure 8:
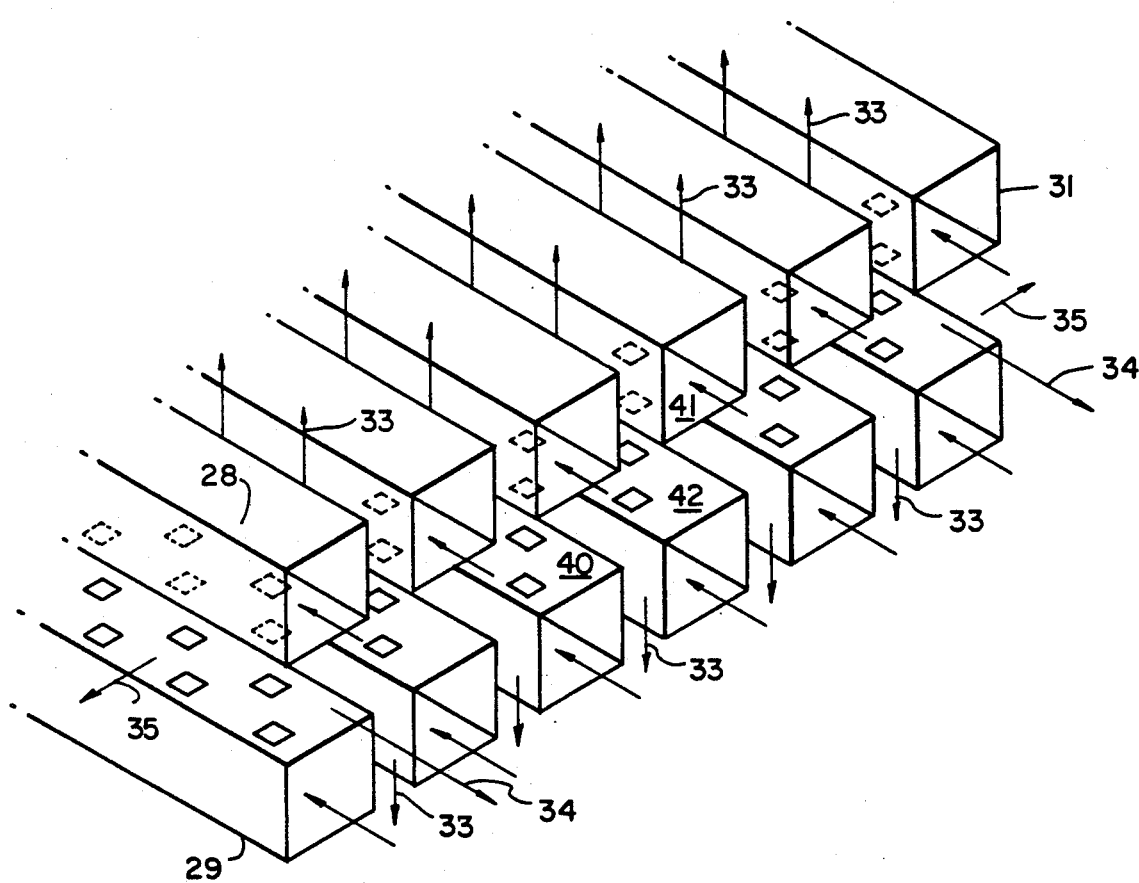
FIG. 8 is a perspective view of the supply duct arrangement for one section of a double-conveyor system.

As illustrated in FIG. 3, in said single conveyor dryer 37, said plug fan 13 is located in a center one-third portion of the length of said drying section 22, and is positioned about 8 inches from said left-side interior wall 24. On the other hand, and as illustrated in FIGS. 1 and 7, in said double conveyor dryer 38, said plug fan 13 is still located in said center one-third portion of the length of said drying section 22, but it is in a centered one-third portion of the width of said drying section 22 as well. Thus, for said double conveyor dryer 38, said plug fan 13 will supply steam to supply steam chambers 3 that are located along both of said interior walls 24 and 25 of said drying section 22.

Figure 10:
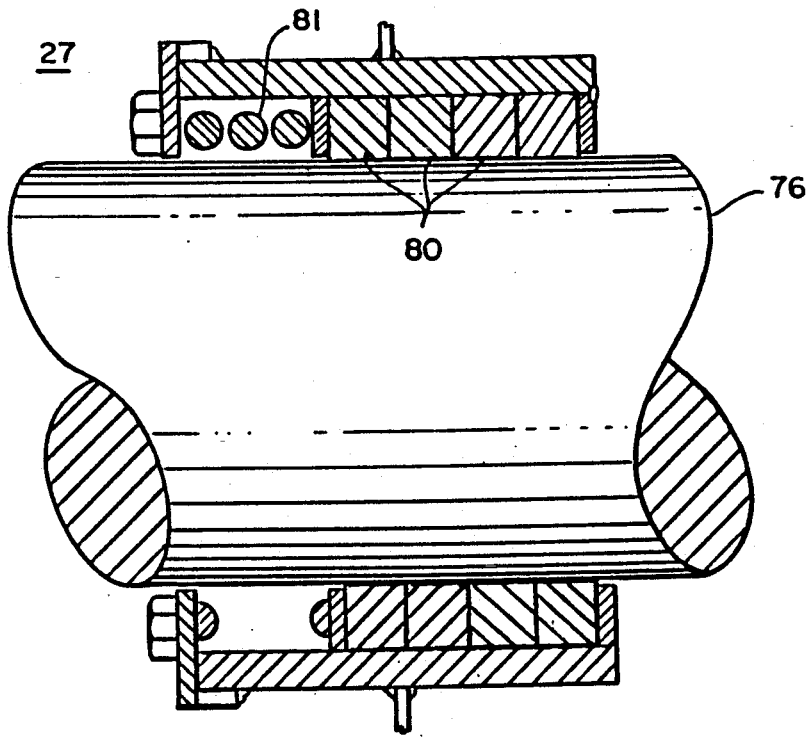
FIG. 10 is a cross-sectional view of the fan shaft seal of the present invention.

An essential feature of said plug fan 13 is a plug fan shaft seal 27 utilized to reduce to about 1–3 cubic feet per minute (CFM) the air in-leakage from the essentially dry-air atmosphere surrounding said steam dryer 1 into said steam drying section 22. In the preferred embodiment, said shaft seal 27, which seals a plug fan shaft 76, comprises a series of self-lubricating graphite-based rings 80 positioned adjacent to a compression spring 81, as illustrated in FIG. 10. This design permits said shaft seal 27 to seal said shaft 76 tightly over extended periods of time. Each of said plug fans 13 located within each of said drying sections 22 operates to provide a supply of steam to said steam-supply chambers 3. In said single conveyor dryer 37 supply steam is forced into a right-side steam-supply shaft 30 within said drying section 22, wherein said right-side steam shaft 30 runs along said right-side interior wall 25, is about 1 foot 4 inches in width, and is common to open supply ends 31 of steam-supply ducts 28 and 29 of each of said steam-supply chambers 3. In said double conveyor dryer 38, in addition to said right-side supply shaft 30, there is a left-side steam-supply shaft 39, located along said left-side interior wall 24. Said left-side supply shaft 39 provides an additional volume of drying steam to said steam-supply ducts 28 and 29 via double conveyor open supply ends 36.

Within each of said steam-supply chambers 3 is a plurality of top steam-supply ducts 28, and a corresponding number of bottom supply ducts 29, all of which are fabricated of aluminized steel. A key feature of said steam dryer 1 of the present invention is that steam is supplied to said products 100 utilizing a plurality of individual supply ducts 28 and 29, which are spaced 4 inches apart, rather than the single supply ducts used in the prior art. Said individual supply ducts 28 and 29 permit large volumes of spent steam to be drawn away from said products 100 and sent to said return chamber 4 by said plug fan 13 from between said supply ducts 28 and 29 via steam-return path 33, as well as by conventional routes such as return paths 34 and 35 of said drying section 22—illustrated in FIGS. 4–6 and 8, thereby reducing steam turbulence about said products 100.

Figure 6:
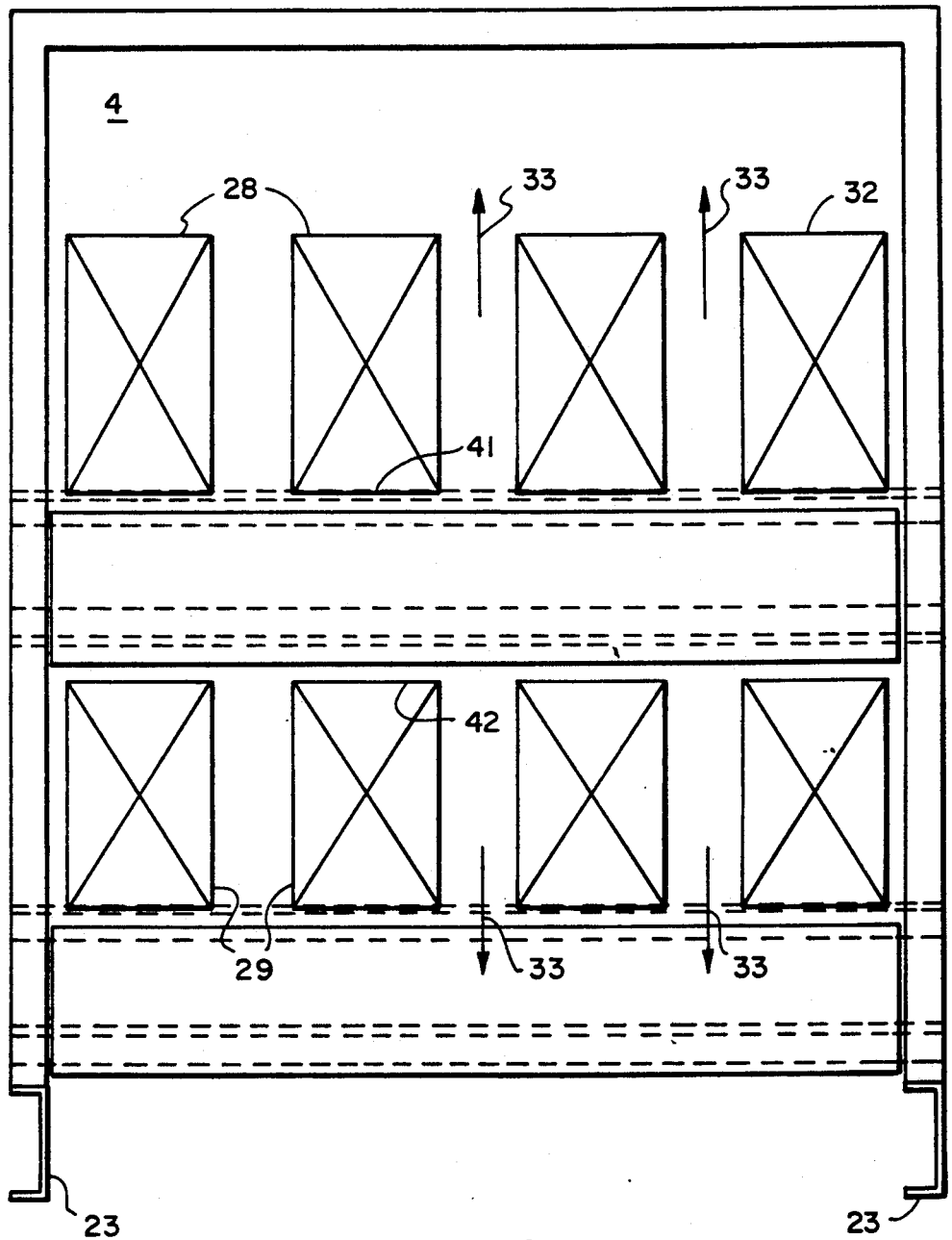
FIG. 6 is a side view of the supply duct arrangement within a steam supply chamber of the present invention, illustrating top and bottom supply ducts for a single-conveyor system.

Said supply ducts 28 and 29, illustrated in FIGS. 5 and 6, are about 8 inches wide and in said single conveyor steam dryer 37 said supply ducts 28 and 29 are about 4 feet 4 inches in length. In said single conveyor steam dryer 37, said top supply ducts 28 taper from a rectangular cross-section of about 1 foot×8 inches at said open supply end 31, to a rectangular cross-section of about 6 inches×8 inches at a closed supply end 32. This taper is necessary in the single conveyor dryer 37 because steam is supplied to said supply ducts 28 and 29 from only one direction—that is, from said right side steam-supply shaft 30. As steam is transferred to said products 100 on said conveyor 2, the volume of steam in said supply ducts 28 and 29 is reduced and a pressure drop occurs. In order to maintain the desired steam velocity impinging on said products, this pressure drop must be minimized. Tapering of said supply ducts 28 and 29 results in a minimization of the pressure drop because it reduces the supply duct volume. In this way, the steam impingement velocity is maintained at the desired level along the entire 4-foot 4-inch length of said supply ducts 28 and 29. In said double conveyor dryer 38 there is no pressure drop problem to overcome, because steam is supplied to said supply ducts 28 and 29 from two directions—that is, from said left-side supply shaft 39 and said right-side supply shaft 30, as illustrated in FIG. 7. The drying sections 22 of said double conveyor dryer 38 are about 8 inches wide and about 9 feet long. Also, said supply ducts 28 and 29 of said double conveyor dryer 38 have constant cross-sectional dimensions 1 foot 4 inches. These ducts are not tapered because sufficient volumes of steam are supplied to the entire length of said double sets of supply ducts 28 and 29 to maintain the desired steam impingement velocity.

In order to dry pulp and molded articles in particular, said steam dryer 1 of the present invention directs superheated steam from said supply ducts 28 and 29 directly onto said products 100 via steam-supply nozzles 40. On said top supply ducts 28, said supply nozzles 40 are located at a top supply duct face 41, and are positioned about 6 inches above said conveyor 2. On said bottom supply ducts 29, said supply nozzles 40 are located at a bottom supply duct face 42, and are positioned about 2 inches below said conveyor 2. In the preferred embodiment, said supply nozzles 40 are 2-inch high tubes, with inside dimensions of about 2 inches×2 inches. Said nozzles 40 preferably are made of aluminized steel, and are welded into supply orifices 93 in said top supply duct face 41 and said bottom supply duct face 42, such that they extend about 1 inch beyond said duct faces 41 and 42. Nozzles 40 of said top duct face 41 and nozzles 40 of said bottom duct face 42 are in direct alignment with each other, corresponding to aligned top supply ducts 28 and bottom supply ducts 29. It is to be understood that said nozzles 40 are required to produce adequate steam impingement velocities to reach the moisture bound within the fibers of pulp and molded articles—which tend to be the thickest products. Such high velocities are not required to dry thinner textile and paper weaves. In such products, drying may be achieved with the same steam flux at a much lower velocity by forming said top supply duct 28 and said bottom supply duct 29 with supply duct faces 41 and 42 that are substantially entirely open.

Figure 9:
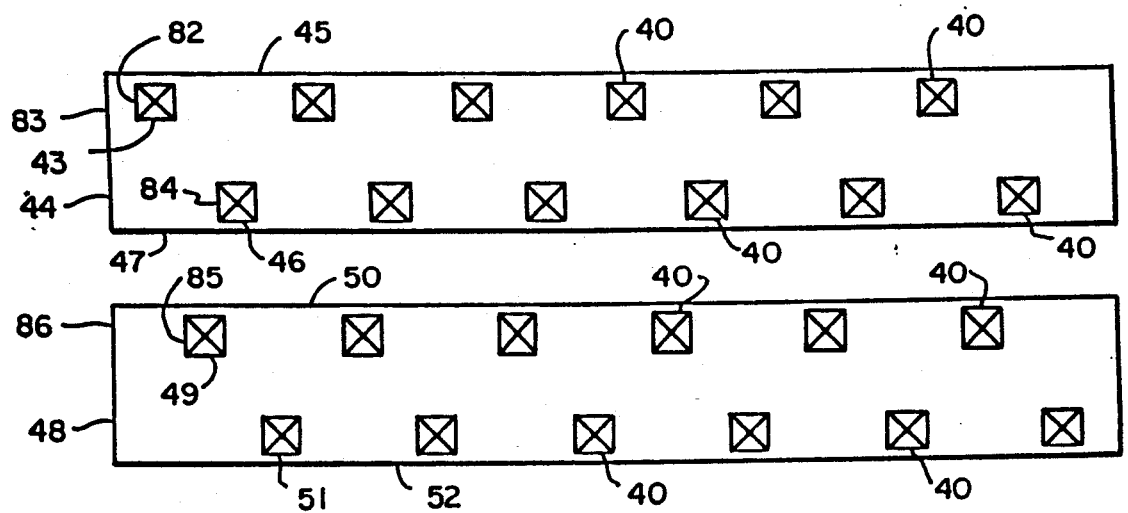
FIG. 9 is a top view of the nozzle arrangement for two adjacent supply ducts.

As illustrated in FIGS. 5 and 9, said nozzles 40 of the present invention are arranged to optimize steam utilization by directing just enough steam onto the surface of said conveyor 2 to uniformly impinge said products 100 being conveyed. This is achieved by offsetting the positions of said nozzles 40 for each pair of two sets of top and bottom supply ducts 28 and 29. Specifically, and as depicted by the nozzle layout illustrated in FIG. 9, a left-side edge 82 of a first left-side exemplar nozzle 43 of a first exemplar supply duct 44 is positioned 1½ inches from a left-side edge 83 of said first exemplar supply duct 44 and said first left-side exemplar nozzle 43 is centered 1¼ inches from a leading edge 45 of said first exemplar supply duct 44. The remainder of said nozzles 40 positioned along said leading edge 45 of said first exemplar supply duct 44 are equally spaced 6 inches apart. A left-side edge 84 of a second exemplar left-side nozzle 46 of said first exemplar duct 44 is positioned 5½ inches from said left-side edge 83 of said first exemplar supply duct 44 and said second exemplar left-side nozzle 46 is centered 1¼ inches from a trailing edge 47 of said first exemplar supply duct 44. The remainder of said nozzles 40 positioned along said trailing edge 47 are equally spaced 6 inches apart. A second exemplar supply duct 48, paired with said first exemplar supply duct 44, comprises nozzles 40 of the same general arrangement as those of said first exemplar supply duct 44. A left-side edge 85 of a third exemplar left-side nozzle 49 on a leading edge 50 of said second exemplar supply duct 48, is positioned 3½ inches from a left-side edge 86 of said second exemplar supply duct 48 and a fourth exemplar left-side nozzle 51 on a trailing edge 52 of said second exemplar supply duct 48, is positioned 7½ inches from said left-side edge 86 of said second exemplar supply duct 48. With this nozzle arrangement, steam impinges said products 100 uniformly with velocities of 1000 FPM or higher.

As previously stated, said drying steam, the volume of which is increased by steam produced by liberating moisture from said products 100, is then pulled by said plug fans 13 into said steam-return chamber 4 via return paths 33–35. The steam drying method described herein requires that a constant drying steam flux be used to dry said products 100. Since there is an overabundance of steam produced in the drying process, excess steam must be provided an escape path from within said individual drying sections 22. This is achieved in the present invention by leaving said steam-return chamber 4 open along the entire length of said steam dryer 1, regardless of the number of adjoining drying sections 22. While some of the excess steam exits said wet-end steam drying section 53, most of it diffuses from leading drying sections to latter drying sections, i.e., from the highly steam-concentrated sections to the less steam-concentrated sections, via said return chamber 4. Some of this excess steam is recirculated back to said steam-supply chamber 3 and the rest comes in contact with said internal steam-condensing means 5. Excess steam contacting said internal steam-condensing means 5 experiences a resultant reduction in both temperature and volume, thereby maintaining the internal pressure of said steam dryer 1 at slightly more than one atmosphere. At the same time, the energy of the excess steam, which is released when the excess steam temperature is reduced, is then recovered by cooling water of said internal steam-condensing means 5.

Figure 11:
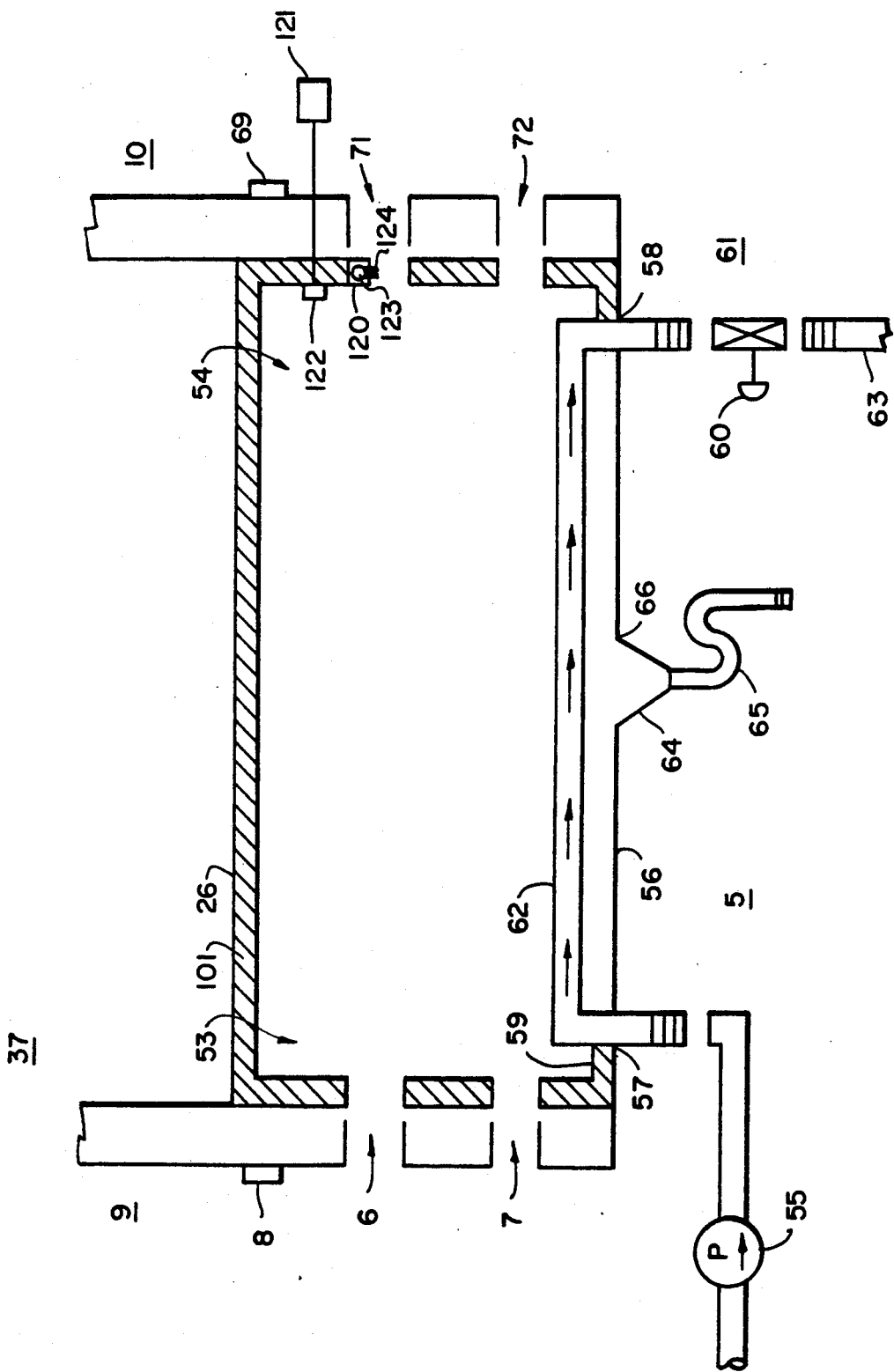
FIG. 11 is a cross-sectional view of the internal steam-condensing means of the present invention.

As illustrated in FIG. 11, in the preferred embodiment of the present invention said internal steam-condensing means 5 extends from said wet-end steam drying section 53 to a dry-end steam drying section 54. Said steam condensing means 5 comprises a cooling water pump 55, a cooling water tube 62, a condensate tray 56, and a condensation control valve 60. Said cooling water pump 55 will vary in size as a function of the quantity of cooling water moved through said cooling water tube 62, and the size of said cooling water tube 62 is dependent upon the quantity of steam within said steam dryer 1 that must be condensed. (Although illustrated as a single tube, said cooling water tube 62 may comprise a plurality of tubes extending along a floor 59 of said return chamber 4.) Said cooling water tube 62 enters said return chamber 4 via a wet-end cooling tube orifice 57 located in said wet-end drying section 53, and said cooling water tube 62 exists said return chamber 4 via a dry-end cooling tube orifice 58 located in said dry-end steam drying section 54. Said condensation control valve 60, affixed to said cooling water tube at a dry-end control position 61, is used to regulate the flow of cold water through said cooling water tube 62, thereby controlling the rate of excess steam condensation. Said control valve 60 is connected, by well-known means, to said wet-end dewpoint controller device 8 and said dry-end dewpoint controller device 69, wherein the opening and closing of said control valve 60 is regulated by Proportional-Integral-Derivative (PID) means. The cooling water—which exits said dry-end steam drying section 54 via said cooling water tube 62 through said dry-end cooling tube orifice 58—is transferable to other pulp and paper processing locations via a main outlet line 63. Said cooling water tube 62 is made of aluminized steel and is welded to said orifices 57 and 58.

Said condensate tray 56 is about 2 feet wide, extends from said wet-end cooling tube orifice 57 to said dry-end cooling tube orifice 58, and is fabricated of aluminized steel. Said condensate tray 56 is located directly under said cooling water tube 62, where it is utilized to gather hot water condensate dripping from said tube 62. Said hot water condensate exits said tray 56 via a drainage port 64, and is transferable either to a main sewer line, or to a heat recovery device, via a condensate return line 65. Said condensate return line 65 is about 3 inches in diameter and exits said steam dryer 1 through a condensation line orifice 66 located at about the midpoint of said floor 59 of said steam-return chamber 4. The quantity of excess steam reduced to condensate and removed via said condensate return line 65 is regulated by said wet-end dewpoint controller device 8 and said dry-end dewpoint controller device 69, both of which operate to control the amount of cooling water running through said cooling water tube 62 via said control valve 60.

The operation of said internal steam-condensing means 5 is regulated to condense most, but not all, of the excess steam in said steam dryer 1. A small percentage of the excess steam located within said return chamber 4 of said dry-end steam drying section 54 is vented from said dry-end steam drying section 54 into said dry-end air/vapor lock chamber 10, via dry-end steam drying section exit ports 67 and dry-end steam drying conveyor return ports 68. Said dry-end air/vapor lock chamber 10 is configured in essentially the same manner as said wet-end air/vapor lock chamber 9, wherein the function of said dry-end air/vapor lock chamber 10 is to prevent dry air in-flow into said dry-end steam drying section 54 of said steam dryer 1. A dry-end dewpoint sensing element 79, attachable to an inside wall 70 of said dry-end air/vapor lock chamber 10, measures the dewpoint of the atmosphere within said dry-end air/vapor lock chamber 10 and relays that information to said dry-end dewpoint controller device 69. Said dry-end dewpoint controller device 69 compares the dewpoint within said dry-end air/vapor lock chamber 10 with the dewpoint of the atmosphere surrounding said steam dryer 1. As previously stated, this information is utilized to send a command signal to said control valve 60. A gaseous mixture of excess steam emitted from said dry-end steam drying section 54 and air coming into said dry-end air/vapor lock chamber 10 via dry-end product exit ports 71 and dry-end conveyor return ports 72 from the atmosphere surrounding said steam dryer 1 is pulled from said dry-end air/vapor lock chamber 10 by a dry-end exhaust fan 73 and exhausted through a dry-end exhaust stack 74. Any steam condensing within said dry-end air/vapor lock chamber 10 is removed via a dry-end air/vapor lock drain 91.

The superheated steam drying process of the present invention comprises the incorporation of said steam dryer 1 into the process of removing moisture from said products 100. Whether the particular product is in sheet form, such that it can be restrained for steam-through drying, or floated through said dryer 1, or whether the product must be conveyed through said dryer 1 on said conveyor 2, such as with pulp and molded articles, the drying process of the present invention can provide the appropriate amount of energy—in an efficient manner—to dry such products quickly, and the present invention can make those products better qualitatively. As previously stated, this is done by drying with a drying medium that is essentially entirely air-free, and consisting almost completely of very hot, unsaturated gaseous water—i.e., superheated steam.

Prior to introducing pulp and paper products to this superheated steam environment, air must be eliminated from said steam dryer 1 and steam must replace the eliminated air. This is done by introducing a precharge of water directly into each of said drying sections 22 of said dryer 1. The size of the water charge in said drying sections 22 is a function of the number of said drying sections 22, but at least large enough so that its volume when converted to steam is sufficiently great that it fills all of said steam dryer 1. At the same time that said precharge of water is introduced to said steam dryer 1, said indirect heaters 19 are turned to their maximum operating temperatures of about 2000° F., and said plug fans 13 are turned on. Furthermore, said wet-end air/vapor lock exhaust fan 18 and said dry-end vapor-lock exhaust fan 73 are turned on and used to draw the "contaminant" air from said drying sections 22. As said heaters 19 vaporize the water within said dryer 1, and said plug fans 13 continuously recirculate the vaporized water past said heaters 19, said steam becomes superheated and its temperature exceeds 800° F. As said steam is being superheated, said wet-end dewpoint sensing element 78 measures the dewpoint within said wet-end air/vapor lock chamber 9 and said dry-end dewpoint sensing element 79 measures the dewpoint within said dry-end air/vapor lock chamber 10. In turn, said wet-end dewpoint controller device 8 and said dry-end dewpoint controller device 69 compare those dewpoints with the dewpoint of the atmosphere surrounding said dryer 1. When the dewpoint within each of said air/vapor lock chambers 9 and 10 exceeds the surrounding dewpoint by more than 10%, and the temperature of the drying steam within said drying sections 22 is about 800° F., said wet products 100 are introduced to said steam dryer 1 via said product entry port 6.

As moisture-laden products 100 are conveyed or pulled into said wet-end drying section 53, they are at a temperature of about 90° F. When introduced to the drying steam, which is at a temperature in excess of 800° F., the product temperature ramps up to, or near, the temperature of the steam. The rate of product temperature increase is a function of the features of the product itself. As previously stated, said dryer 1 may be formed of a multiplicity of said drying sections 22. As said products 100 are conveyed through said drying sections 22, the operating rate of said plug fans 13 is controlled to introduce a sufficient volume of steam into said steam-supply chambers 3 to dry the particular products being conveyed. For molded articles the recirculation rate is about 120,000 CFM near the wet-end of said dryer 1 and about 80,000 CFM near the dry-end, where the articles are lighter in weight. For paper weaves, the recirculation rate near the wet-end is about 80,000 CFM, and near the dry-end it is about 40,000 CFM.

As previously noted, nozzles 40 of said top and bottom supply ducts 28 and 29 are required to increase the velocity of the drying steam used to impinge the surface of thick molded articles and pulp. In the preferred process of the present invention, within said wet-end drying section 53, the steam exiting said nozzles 40 of said top supply ducts 28 impinges said products 100 at a speed of about 1200 FPM. From said nozzles 40 of said bottom supply ducts 29, the steam impingement velocity is only about 500 FPM, primarily because the steam from said bottom ducts 29 is diffused by said conveyor 2. However, within said dry-end steam drying section 54, the steam impingement velocities are reduced to about 800 FPM and 300 FPM, respectively, to compensate for the reduction in weight of said products 100 at that end of said steam dryer 1. For much thinner products, wherein much lower velocities can achieve the same drying, and higher velocities are undesirable, said supply duct faces 41 and 42 are substantially entirely open and the steam impingement velocity is about 50 FPM throughout said steam dryer 1.

Said plug fans 13 also draw a mix of the steam of the moisture liberated from said products 100 and the original drying steam into said steam-return chamber 4 via return paths 33-35. This spent steam is recirculated past said indirect heaters 19 and into said supply chambers 3, to be used as drying steam again. The remaining excess steam diffuses through said return chamber 4, which is common to all of said drying sections 22, toward said dry-end steam drying section 54. As the steam drying process of the present invention continues, and said products 100 are conveyed through said dryer 1, the dewpoint within said wet-end air/vapor lock chamber 9 and the dewpoint within said dry-end air/vapor lock chamber 10 are continuously monitored by said wet-end dewpoint controller device 8 and said dry-end dewpoint controller device 69, respectively. When the dewpoint within both said wet-end air/vapor lock chamber 9 and said dry-end air/vapor lock chamber 10 is about 10% higher than the dewpoint of the atmosphere surrounding said dryer 1—indicating an excess steam build-up within said dryer 1—either said wet-end dewpoint controller device 8 or said dry-end dewpoint controller device 69 commands said condensation control valve 60 to begin the operation of said internal steam-condensing means 5 and wet-end air/vapor lock feedback control means 102 vary the speed at which said wet-end exhaust fan 18 draws contaminant air and said spent steam into said wet-end air/vapor lock chamber 9.

Said internal steam-condensing means 5 operates essentially as a heat exchanger, wherein said cooling water is pumped by said cooling water pump 55 into said wet-end drying section 53, via said cooling water tube 62. Said cooling water enters at a temperature of about 70° F. and exchanges energy with said spent steam—which is superheated at a temperature of about 800° F. in said wet-end drying section 53, and about 500° F. in said dry-end steam drying section 54. Said cooling water then exits said dry-end steam drying section 54 via said cooling water tube 62, at a temperature of about 210° F. As said spent steam comes in contact with said cooling water tube 62, the temperature of said spent steam is reduced. As a result, the specific volume of that particular mass of steam is reduced. When the temperature of the steam contacting said cooling water tube 62 is reduced to a point below the dew point within any one of said drying sections 22, the steam condenses. The volume of steam to be condensed is a function of the volume of steam exiting said steam dryer 1 via said wet-end air/vapor lock chamber 9 and said dry-end air/vapor lock chamber 10. As the dewpoints within said chambers 9 and 10 are monitored, the volume of cooling water flowing through said cooling water tube 62 is varied to provide just enough cooling to control the volume of steam being condensed *and* the volume of steam exiting said steam dryer 1. When the dewpoints within said chambers 9 and 10 both exceed the dewpoint of the atmosphere surrounding said steam dryer 1 by less than 5%, the volume of cooling water flowing through said cooling water tube 62 is reduced, and dry-end air/vapor lock feedback control means 103 vary the speed at which said dry-end exhaust fan 73 draws contaminant air and said spent steam into said dry-end air/vapor lock chamber 10.

As previously indicated, said products 100 move into said dry-end steam drying section 54 at a lower moisture content and, therefore, at a lower weight than when they entered said wet-end drying section 53. For this reason, said plug fans 13 towards the dry-end of said steam dryer 1 operate at reduced circulation rates. Also, as said products 100 approach the dry-end of said steam dryer 1, they are at or near the temperature of the steam—or about 800° F. In an air-rich environment this temperature would result in spontaneous ignition of said products 100, but in the air-free environment of the present invention spontaneous ignition will not occur and the high temperatures increase the enthalpic capacity of the drying steam, thereby increasing drying efficiency. When said products have been dried to a moisture content of about 8%, they exit said dryer 1 via said exit ports 71, and enter the next phase of the manufacturing process. If they were to leave at the operating temperature of 800° F. or more, they would immediately explode into flame. For this reason, said indirect heater 19 in said dry-end steam drying section 54 operates at a temperature of about 200° F. The combination of the reduced temperature of said indirect heater 19 and the cooling effect of the condensation process reduces the temperature of said products 100 within said dry-end steam drying section 54—that is, as they enter said dry-end air/vapor lock chamber 10—to about 350° F.; however, they may be as much as 500° F. In order to ensure that the temperature of said products 100 exiting said dry-end air/vapor lock chamber 10 is below their ignition temperature, a cooling water spray device 120 controlled by a water-coolant controller 121 operates to spray said products 100 as necessary to reduce the product temperature at said dry-end exit port 71. Specifically, when internal temperature measurement means 122 relays to said water-coolant controller 121 an internal dryer temperature in excess of 375° F., said water-coolant controller 121 initiates the cooling procedure within said dry-end air/vapor lock chamber 10. Water at a temperature of about 70° F. is directed into a product-coolant pipe 123, through a plurality of product-coolant nozzles 124 and onto said products 100, as illustrated in FIG. 11. As a result, said products exit said dry-end air/vapor lock chamber 10 at a temperature less than 300° F. Below that temperature, said products will not ignite in air and, in addition, may be handled by automatic stacking devices beyond said steam dryer 1.

An additional feature of said steam dryer 1—a feature which is not essential to the actual operation of said steam dryer 1, but provides the user with greater convenience—is said cooldown exhaust stack 75. Said cooldown exhaust stack 75 permits rapid cooling within said dryer 1 so that any maintenance procedures may be conducted shortly after the completion of a production run, or shortly after a problem is detected within any one of said dryer sections 22. Said maintenance access doors 77 permit entrance to said drying sections 22 via said steam-supply shaft 30. Although a central exhaust stack is necessary in the operation of hot-air dryers, the present invention operates essentially as a closed system and therefore does not require the type of large air-volume exchanges provided by such central exhaust stacks.

Although the preferred embodiment of the apparatus and method of the present invention has been described herein, the above description is merely illustrative. Accordingly, it is to be understood that the present invention is not limited to that precisely described herein.

I claim:

1. Apparatus for the removal of water from cellulosic and textile products, wherein said water is removed by steam drying means, said apparatus comprising:
   a. product-conveying means for receiving and conveying said products into and through said apparatus, and for transferring said products away from said apparatus;
   b. a wet-end steam drying section, a plurality of intermediate steam drying sections, and a dry-end steam drying section, wherein said wet-end steam drying section, said intermediate steam drying sections, and said dry-end steam drying section each comprise:
  i. steam-recirculation means for directing drying steam onto said products and drawing spent steam away from said products;
  ii. indirect heating means for heating said drying steam, wherein said indirect heating means is positioned in close proximity to said steam-recirculation means;
  iii. an isolated steam-supply chamber, wherein said steam-recirculation means directs said drying steam past said indirect heating means and into said steam-supply chamber, and wherein said drying steam passes from said steam-supply chamber onto said products; and
  iv. an open steam-return chamber, wherein said product-conveying means passes through said open steam-return chamber, wherein said steam-recirculation means draws said spent steam from said products and into an upper portion of said open steam-return chamber, and wherein said open steam-return chamber is common to said wet-end steam drying section, to said intermediate steam drying sections, and to said dry-end steam drying section;
c. internal steam-condensing means for condensing an excess of said spent steam, wherein said excess of said spent steam within said open steam-return chamber comes in contact with, and is condensed by, said internal condensing means, and wherein said internal steam-condensing means is positioned essentially entirely within said open steam-return chamber;
d. a wet-end air/vapor lock chamber for preventing the ingress of air into said wet-end steam drying section, wherein said product-conveying means first passes through said wet-end air/vapor lock chamber and into said wet-end drying section, and wherein air entering said apparatus with said product-conveying means and spent steam exiting from said wet-end steam drying section are drawn into and exhausted from said wet-end air/vapor lock chamber;
e. a dry-end air/vapor lock chamber for preventing the ingress of air into said dry-end steam drying section, wherein said product-conveying means passes from said dry-end steam drying section and into said dry-end air/vapor lock chamber, and wherein air entering said apparatus through said product-conveying means and spent steam exiting from said dry-end steam drying section are drawn into and exhausted from said dry-end air/vapor lock chamber; and
f. insulation means for maintaining the temperature level within said apparatus, wherein said insulation means is affixed between interior walls of said apparatus and exterior walls of said apparatus.

2. The apparatus as claimed in claim 1 wherein said interior walls of said apparatus are sealed to prevent steam within the interior of said apparatus from contacting said insulation means.

3. The apparatus as claimed in claim 1 wherein said steam-recirculation means is a variable-speed plug fan.

4. The apparatus as claimed in claim 3 wherein said variable-speed plug fan further comprises a plug fan shaft seal, wherein said plug fan shaft seal limits the ingress of air from about a shaft of said variable-speed plug fan and into said drying sections to about 1 to 3 cubic feet per minute.

5. The apparatus as claimed in claim 1 wherein said indirect heating means is a gas-fired indirect heater.

6. The apparatus as claimed in claim 1 wherein said isolated steam-supply chamber further comprises a plurality of steam-supply ducts, wherein said drying steam enters each of said plurality of steam-supply ducts, wherein said steam-supply ducts are positioned above and below said product-conveying means, and wherein said drying steam passes through said steam-supply ducts and onto said products.

7. The apparatus as claimed in claim 6 wherein one-half of said plurality of steam-supply ducts are top steam-supply ducts and the other one-half of said plurality of steam-supply ducts are bottom steam-supply ducts, wherein said top steam-supply ducts are positioned above said product-conveying means and said bottom steam-supply ducts are positioned below said product-conveying means.

8. The apparatus as claimed in claim 6 wherein said steam-supply ducts comprise a plurality of steam-supply nozzles, wherein said steam-supply nozzles are affixed to supply duct faces of said steam-supply ducts and wherein said steam-supply nozzles direct said drying steam onto said products.

9. The apparatus as claimed in claim 8 wherein said steam-supply nozzles comprise openings 2-inches×2-inches in cross-section.

10. The apparatus as claimed in claim 6 wherein said steam-supply ducts comprise supply duct faces, wherein said drying steam is directed through said supply duct faces onto said products, and wherein said supply duct faces are substantially entirely open.

11. The apparatus as claimed in claim 1 wherein said internal steam-condensing means comprises:
  a. a cooling water tube located substantially entirely within said apparatus, wherein said cooling water tube runs along a floor of said open steam-return chamber, and wherein cooling water within said cooling water tube is introduced to each of said steam drying sections;
  b. means for conveying said cooling water from a cooling water source into said cooling water tube;
  c. a sealed cooling tube ingress orifice located in a floor of said open steam-return chamber of said wet-end steam drying section, wherein said cooling water tube enters said open steam-return chamber through said sealed cooling tube ingress orifice;
  d. a sealed cooling tube egress orifice located in a floor of said open steam-return chamber of said dry-end steam drying section, wherein said cooling water tube exits said open steam-return chamber through said sealed cooling tube egress orifice;
  e. means for conveying said cooling water away from said cooling water tube;
  f. a control valve for regulating the volume of cooling water passing through said cooling water tube, wherein said control valve is positioned on a portion of said cooling water tube which is external to said apparatus; and
  g. means for removing steam condensate from said apparatus, wherein said steam condensate is formed by the condensation of said excess of spent steam contacting said cooling water tube.

12. The apparatus as claimed in claim 11 wherein said means for removing steam condensate comprises a condensate tray, wherein condensed steam located on said cooling water tube drains into said condensate tray, wherein said condensate tray is positioned under said cooling water tube and wherein a condensate drain of said condensate tray transfers said condensed steam away from said apparatus.

13. The apparatus as claimed in claim 1 wherein said wet-end air/vapor lock chamber comprises:
 a. a wet-end product entry port through which said product-conveying means enters said wet-end air/vapor lock chamber;
 b. a wet-end conveyor return port through which said product-conveying means exits said wet-end air/vapor lock chamber;
 c. a wet-end dewpoint sensing device, wherein said wet-end dewpoint sensing device is affixed to an inside wall of said wet-end air/vapor lock chamber and wherein said wet-end dewpoint sensing device measures the dewpoint within said wet-end air/vapor lock chamber and transmits the dewpoint measurement to a wet-end dewpoint controller device, wherein said wet-end dewpoint controller device is affixed to an outside wall of said wet-end air/vapor lock chamber;
 d. a wet-end steam drying section entry port through which said product-conveying means enters said open steam-return chamber of said wet-end steam drying section;
 e. a wet-end steam drying section conveyor return port through which said product-conveying means exits said open steam-return chamber of said wet-end drying section;
 f. a wet-end exhaust fan, wherein said wet-end exhaust fan draws air from the atmosphere surrounding said apparatus through said wet-end product entry port and said wet-end conveyor return port into said wet-end air/vapor lock chamber, wherein said wet-end exhaust fan draws spent steam from said open steam-return chamber of said wet-end drying section through said wet-end steam drying section entry port and said wet-end drying section conveyor return port into said wet-end air/vapor chamber; and
 g. wet-end exhaust control means for regulating the rate at which said air and said spent steam are exhausted from said wet-end air/vapor lock chamber by said wet-end exhaust fan.

14. The apparatus as claimed in claim 13 wherein said dry-end air/vapor lock chamber comprises:
 a. a dry-end steam drying section exit port through which said product-conveying means enters said dry-end air/vapor lock chamber;
 b. a dry-end steam drying section drying section conveyor return port through which said product-conveying means exits said open steam-return chamber of said dry-end steam drying section;
 c. a dry-end dewpoint sensing device, wherein said dry-end dewpoint sensing device is affixed to an inside wall of said dry-end air/vapor lock chamber and wherein said dry-end dewpoint sensing device measures the dewpoint within said dry-end air/vapor lock chamber and transmits the dewpoint measurement to a dry-end dewpoint controller device, wherein said dry-end dewpoint controller device is affixed to an outside wall of said dry-end air/vapor lock chamber;
 d. a dry-end product exit port through which said product-conveying means exits said dry-end air/vapor lock chamber;
 e. a dry-end conveyor return port through which said product-conveying means exits said dry-end air/vapor lock chamber; and
 f. a dry-end exhaust fan, wherein said dry-end exhaust fan draws air from the atomosphere surrounding said apparatus through said dry-end product exit port and said dry-end conveyor return port into said dry-end air/vapor lock chamber, wherein said dry-end exhaust fan draws spent steam from said open steam-return chamber of said dry-end steam drying section through said dry-end steam drying section exit port and said dry-end steam drying section conveyor return port into said dry-end air/vapor lock chamber; and
 g. dry-end exhaust control means for regulating the rate at which said air and said spent steam are exhausted from said dry-end air/vapor lock chamber by said dry-end exhaust fan.

15. The apparatus as claimed in claim 14 wherein said wet-end dewpoint controller device and said dry-end dewpoint controller device control the opening and closing of a control valve of said internal steam-condensing means.

16. The apparatus as claimed in claim 2 wherein said interior walls of said apparatus are welded togetther.

17. Apparatus for the removal of water from cellulosic and textile products, wherein said water is removed by steam drying means, said apparatus comprising:
 a. product-conveying means for receiving and conveying said products into and through said apparatus, and for transferring said products away from said apparatus;
 b. a wet-end steam drying section, a plurality of intermediate steam drying sections, and a dry-end steam drying section, wherein said wet-end steam drying section, said intermediate steam drying sections, and said dry-end steam drying section each comprise:
  i. steam-recirculation means for directing said drying steam onto said products and drawing spent steam away from said products;
  ii. indirect heating means for heating said drying steam, wherein said indirect heating means is positioned in close proximity to said steam-recirculation means;
  iii. an isolated steam-supply chamber comprising a plurality of steam-supply ducts, wherein said steam-recirculation means directs said drying steam past said indirect heating means and into said steam-supply chamber, wherein said drying steam enters each of said plurality of steam-supply ducts, and wherein said steam-supply ducts are positioned above and below said product-conveying means; and
  iv. an open steam-return chamber, wherein said product-conveying means passes through said open steam-return chamber, wherein said drying steam from said steam-supply ducts drys said products, wherein said steam-recirculation means draws said spent steam from said products and into an upper portion of said open steam-return chamber, and wherein said open steam-return chamber is common to said wet-steam drying section, to said intermediate steam drying sections, and to said dry-end steam drying section;

c. internal stream-condensing means for condensing an excess of said spent steam, wherein said excess of said spent steam within said open steam-return chamber comes in contact with, and is condensed by, said internal condensing means, said internal steam-condensing means comprising:
  i. a cooling water tube located substantially entirely within said apparatus, wherein said cooling water tube runs along a floor of said open steam-return chamber, wherein cooling water within said cooling water tube is introduced to each of said steam drying sections;
  ii. means for conveying said cooling water into and out of said cooling water tube;
  iii. a sealed cooling tube ingress orifice located in a floor of said open steam-return chamber of said wet-end steam drying section, wherein said cooling water tube enters said open steam-return chamber through said sealed cooling tube ingress orifice;
  iv. a sealed cooling tube egress orifice located in a floor of said open steam-return chamber of said dry-end steam drying section, wherein said cooling water tube exits said open steam-return chamber through said sealed cooling tube egress orifice;
  v. a control valve for regulating the volume of cooling water passing through said cooling water tube, wherein said control valve is positioned on a portion of said cooling water tube which is external to said apparatus; and
  vi. a condensate tray, wherein condensed steam located on said cooling water tube drains into said condensate tray, wherein said condensate tray is positioned under said cooling water tube and wherein a condensate drain of said condensate tray transfers said condensed steam away from said apparatus;

a wet-end air/vapor lock chamber for preventing the ingress of air into said wet-end steam drying section, wherein said product-conveying means first passes through said wet-end air/vapor lock chamber and into said wet-end drying section, said wet-end air/lock chamber comprising:
  i. a wet-end product entry port through which said product-conveying means enters said wet-end air/vapor lock chamber;
  ii. a wet-end conveyor return port through which said product-conveying means exits said wet-end air/vapor lock chamber;
  iii. a wet-end dewpoint sensing device, wherein said wet-end dewpoint sensing device is affixed to an inside wall of said wet-end air/vapor lock chamber and wherein said wet-end dewpoint sensing device measures the dewpoint within said wet-end air/vapor lock chamber and transmits the dewpoint measurement to a wet-end dewpoint controller device, wherein said wet-end dewpoint controller device controls the opening and closing of said control valve, and wherein said wet-end dewpoint controller device is affixed to an outside wall of said wet-end air/vapor lock chamber;
  iv. a wet-end steam drying section entry port through which said product-conveying means enters said open steam-return chamber of said wet-end steam drying section;
  v. a wet-end steam drying section conveyor return port through which said product-conveying means exits said open steam-return chamber of said wet-end drying section;
  vi. a wet-end exhaust fan, wherein said wet-end exhaust fan draws air from the atmosphere surrounding said apparatus through said wet-end product entry port and said wet-end conveyor return port into said wet-end air/vapor lock chamber, wherein said wet-end exhaust fan draws spent steam from said open steam-return chamber of said wet-end drying section through said wet-end steam drying section entry port and said wet-end steam drying section conveyor return port into said wet-end air/vapor lock chamber; and
  vii. wet-end exhaust control means for regulating the rate at which said air and said spent steam are exhausted from said wet-end air/vapor lock chamber via a wet-end exhaust stack;

e. a dry-end air/vapor lock chamber for preventing the ingress of air into said dry-end steam drying section, wherein said product-conveying means passes from said dry-end steam drying section into said dry-end air/vapor lock chamber, said dry-end aie/vapor lock chamber comprising:
  i. a dry-end steam drying section exit port through which said product-conveying means enters said dry-end air/vapor lock chamber;
  ii. a dry-end steam drying conveyor return port through which said product-conveying means exits said open steam-return chamber of said dry-end steam drying section;
  iii. a dry-end dewpoint sensing device, wherein said dry-end dewpoint sensing device is affixed to an inside wall of said dry-end air/vapor lock chamber and wherein said dry-end dewpoint sensing device measures the dewpoint within said dry-end air/vapor lock chamber and transmits the dewpoint measurement to said dry-end dewpoint controller devcie, wherein said dry-end dewpoint controller device controls the opening and closing of said control valve, and wherein said dry-end dewpoint controller device is affixed to an outside wall of said dry-end air/vapor lock chamber;
  iv. a dry-end product exit port through which said product-conveying means exits said dry-end air/vapor lock chamber;
  v. a dry-end conveyor return port through which said product-conveying means exits said dry-end air/vapor lock chamber; and
  vi. a dry-end exhaust fan, wherein said dry-end exhaust fan draws air from the atmosphere surrounding said apparatus through said dry-end product exit port and said dry-end conveyor return port into said dry-end air/vapor lock chamber, wherein said dry-end exhaust fan draws spent steam from said open steam-return chamber of said dry-end steam drying section through said dry-end steam drying section exit port and said dry-end steam drying section conveyor return port into said dry-end air/vapor lock chamber; and
  vii. dry-end exhaust control means for regulating the rate at which said air and said spent steam are exhausted from said dry-end air/vapor lock chamber by said dry-end exhaust fan; and f. insulation means for maintaining the temperature level within said apparatus, wherein said insulation means is affixed between interior walls of said apparatus and exterior walls of said apparatus, and wherein said interior walls of said apparatus are selected to prevent drying steam and spent steam within the interior of said apparatus from contacting said insulation means.

18. Process of removing water from cellulosic and textile products, wherein said water is removed by steam, said process comprising the steps of:
   a. introducing a precharge of water into a steam drying apparatus, wherein said steam drying apparatus comprises:
      i. product-conveying means for receiving and conveying said products into and through said apparatus, and for transferring said products away from said apparatus;
      ii. a wet-end steam drying section, a plurality of intermediate steam drying sections, and a dry-end steam drying section, wherein said wet-end steam drying section, said intermediate steam drying sections, and said dry-end steam drying section each comprise:
         (a) steam-recirculation means;
         (b) indirect heating means, wherein said indirect heating means is positioned in close proximity to said steam-recirculation means;
         (c) an isolated steam-supply chamber, wherein said steam-supply chamber comprises drying steam application means; and
         (d) an open steam-return chamber, wherein said product-conveying means passes through said open steam-return chamber and wherein said open steam-return chamber is common to said wet-end steam drying section, to said intermediate steam drying sections, and to said dry-end steam drying section;
      iii. internal steam-condensing means for condensing an excess of spent steam, wherein said internal steam-condensing means is positioned essentially entirely within said open steam-return chamber;
      iv. a wet-end air/vapor lock chamber for preventing the ingress of air into said wet-end steam drying section, wherein said product-conveying means first passes through said wet-end air/vapor lock chamber and into said wet-end drying section;
      v. a dry-end air/vapor lock chamber for preventing the ingress of air into said dry-end steam drying section, wherein said product-conveying means passes from said dry-end steam drying section and into said dry-end air/vapor lock chamber; and
      vi. insulation means for maintaining the tempurature level within said apparatus, wherein said insulation means is affixed between interior walls of said apparatus and exterior walls of said apparatus, and wherein said interior walls of said apparatus are sealed to prevent steam within the interior of said apparatus from contacting said insulation means;
   b. heating said precharge of water with said indirect heating means to form saturated steam;
   c. removing air from said apparatus with air removal means until the atmosphere within said apparatus is comprised substantially entirely of said saturated steam;
   d. superheating said saturated steam to form drying steam by circulating said saturated steam from said open steam-return chamber past said indirect heating means utilizing said steam-recirculation means;
   e. measuring the dewpoint within said wet-end air/vapor lock chamber utilizing a wet-end dewpoint sensing device, and measuring the dewpoint within said dry-end air/vapor lock chamber utilizing a dry-end dewpoint sensing device and adjusting the operation of said steam-recirculation means and said indirect heating means to regulate the dewpoint within said wet-end air/vapor lock chamber and the dewpoint within said dry-end air/vapor lock chamber;
   f. conveying said products into said apparatus by said product-conveying means when the dewpoint within said wet-end air/vapor lock chamber and the dewpoint within said dry-end air/vapor lock chamber both exceed the dewpoint of the atmosphere surrounding said apparatus;
   g. forcing said drying steam into said isolated steam-supply chamber utilizing said steam-recirculation means;
   h. drying said products conveyed into said apparatus by applying said drying steam from said steam-supply chamber to said products as said products pass by on said product-conveying means;
   i. withdrawing spent steam away from said products into an upper portion of said steam-return chamber utilizing said steam-recirculation means;
   j. recirculating a portion of said spent steam past said indirect heating means to reform said drying steam;
   k. redirecting said drying steam, which has been formed by recirculating said spent steam into said steam-return chamber; and
   l. removing said products from said dry-end steam drying section of said apparatus uIilizing said product removal means.

19. The process as claimed in claim 18 further comprising the step of condensing an excess of said spent steam within said open steam-return chamber, utilizing said internal steam-condensing means when the dewpoint within said wet-end air/vapor lock chamber and the dewpoint within said dry-end air/vapor lock chamber both exceed the dewpoint of the atmosphere surrounding said apparatus by more than 10%.

20. The process as claimed in claim 19 further comprising the steps of:
   a. monitoring steam condensation rate within said apparatus; and
   b. reducing said steam condensation rate when the dewpoint within said wet-end air/vapor chamber and the dewpoint within said dry-end air/vapor lock chamber both exceed the dewpoint of the atmosphere surrounding said apparatus by less than 5%.

21. The process as claimed in claim 18 wherein said steam-supply chamber comprises a plurality of steam-supply ducts, wherein said steam-supply ducts are positioned above and below said product-conveying means.

22. The process as claimed in claim 21 wherein said products are molded articles and steam-supply duct faces of said steam-supply ducts comprise a plurality of steam-supply nozzles, wherein said drying steam is directed from said steam-supply chamber, through said steam-supply nozzles and onto said molded articles at a velocity of about 1000 feet per minute.

23. The process as claimed in claim 21 wherein said products are thin-weave sheet products and steam-supply duct faces of said steam-supply ducts are substantially entirely open, wherein said drying steam is directed from said steam-supply chamber, through said steam-supply ducts and onto said thin-weave sheet products at a velocity of about 50 feet per minute.

24. The process as claimed in claim 18 wherein said drying steam is superheated to a temperature above 375° F.

25. The process as claimed in claim 24 wherein said drying steam is superheated to a temperature of about 800° F.

26. The process as claimed in claim 18 further comprising the step of reducing the temperature of said drying steam in said dry-end steam drying section by reducing the operating temperature of said indirect heating means in said dry-rnd steam drying section.

27. The process as claimed in claim 26 wherein the operating temperature of said indirect heating means in said dry-end steam drying section is about 200° F.

28. The process as claimed in claim 18 further comprising the steps of:
   a. exhausting a mixture of air and an excess of said spent steam from said wet-end steam drying section through a wet-end exhaust stack of said wet-end air/vapor lock chamber; and
   b. exhausting a mixture of air and an excess of said spent steam from said dry-end steam drying section through a dry-end exhaust stack of said dry-end air/vapor lock chamber.

* * * * *